US012716640B2

(12) United States Patent
Ham et al.

(10) Patent No.: US 12,716,640 B2
(45) Date of Patent: Aug. 25, 2026

(54) REFRIGERATOR

(71) Applicant: SAMSUNG ELECTRONICS CO., LTD., Suwon-si (KR)

(72) Inventors: Hyungkwen Ham, Suwon-si (KR); Namsoo Park, Suwon-si (KR); Jaemin Park, Suwon-si (KR); Youngkyun Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 173 days.

(21) Appl. No.: 17/967,555

(22) Filed: Oct. 17, 2022

(65) Prior Publication Data

US 2023/0042214 A1 Feb. 9, 2023

Related U.S. Application Data

(63) Continuation of application No. PCT/KR2021/002995, filed on Mar. 11, 2021.

(30) Foreign Application Priority Data

Apr. 17, 2020 (KR) ........................ 10-2020-0046986
May 15, 2020 (KR) ........................ 10-2020-0058399

(51) Int. Cl.
*E05D 7/00* (2006.01)
*E05D 7/04* (2006.01)
(Continued)

(52) U.S. Cl.
CPC ......... *F25D 23/028* (2013.01); *E05D 7/0423* (2013.01); *E05B 65/0042* (2013.01); *E05Y 2900/31* (2013.01); *F25D 2323/024* (2013.01)

(58) Field of Classification Search
CPC ............. F25D 23/028; F25D 2323/024; E05D 7/0423; E05D 7/04; E05D 7/081; E05B 65/0042; E05Y 2900/31
See application file for complete search history.

(56) References Cited

U.S. PATENT DOCUMENTS 7,213,300 B1 * 5/2007 Domenig .................. E05D 7/04 16/236
8,506,026 B2 8/2013 Kim et al.
(Continued)

FOREIGN PATENT DOCUMENTS

KR 95-31111 U 11/1995
KR 20-0127576 Y1 1/1999
(Continued)

OTHER PUBLICATIONS

International Search Report dated Jun. 21, 2021 in International Application No. PCT/KR2021/002995.
(Continued)

*Primary Examiner* — Kimberley S Wright
(74) *Attorney, Agent, or Firm* — STAAS & HALSEY LLP

(57) ABSTRACT

A refrigerator includes a cabinet, a door configured to open or close the cabinet; a fixing bracket fixed to the cabinet; a moving bracket under the fixing bracket to be movable with respect to the fixing bracket; a hinge bracket on the moving bracket and including a hinge shaft rotatably coupled to a lower end of the door; and a hinge shaft adjuster configured to move the moving bracket in a forward direction or a backward direction with respect to a front surface of the cabinet.

8 Claims, 39 Drawing Sheets

(51) Int. Cl.
*F25D 23/02* (2006.01)
*E05B 65/00* (2006.01)

(56) References Cited

U.S. PATENT DOCUMENTS

| | | | | |
|---|---|---|---|---|
| 8,894,168 | B2 | 11/2014 | Lee | |
| 2006/0042306 | A1 | 3/2006 | Choi et al. | |
| 2006/0244351 | A1 * | 11/2006 | Moon | F25D 23/028 312/405 |
| 2009/0179539 | A1 * | 7/2009 | Henriksson | F25D 23/028 312/405 |
| 2010/0033067 | A1 * | 2/2010 | Kim | E05D 7/0423 16/221 |
| 2012/0032572 | A1 * | 2/2012 | Lee | E05F 5/02 312/405 |
| 2012/0038258 | A1 | 2/2012 | Park et al. | |
| 2014/0232250 | A1 * | 8/2014 | Kim | F25D 23/028 312/292 |
| 2017/0003067 | A1 * | 1/2017 | Lee | F25D 23/028 |
| 2017/0138104 | A1 | 5/2017 | Kim et al. | |
| 2018/0148962 | A1 * | 5/2018 | Jung | F25D 23/028 |
| 2021/0247128 | A1 * | 8/2021 | Jeong | F25D 23/028 |
| 2022/0282539 | A1 * | 9/2022 | Li | E05D 7/084 |

FOREIGN PATENT DOCUMENTS

| | | | | | |
|---|---|---|---|---|---|
| KR | 0127576 | Y1 | * | 1/1999 | F25D 23/028 |
| KR | 2000-0051415 | A | | 8/2000 | |
| KR | 2000-0051589 | A | | 8/2000 | |
| KR | 10-0299874 | B1 | | 11/2001 | |
| KR | 20-0277264 | Y1 | | 6/2002 | |
| KR | 20-0338105 | Y1 | | 1/2004 | |
| KR | 20060000224 | A | * | 1/2006 | |
| KR | 10-2006-0019641 | A | | 3/2006 | |
| KR | 10-2006-0111211 | A | | 10/2006 | |
| KR | 10-2007-0049295 | | | 5/2007 | |
| KR | 10-2010-0019616 | A | | 2/2010 | |
| KR | 10-2012-0013750 | A | | 2/2012 | |
| KR | 101526731 | B1 | * | 6/2015 | |
| KR | 10-2015-0109806 | A | | 10/2015 | |
| KR | 10-2016-0099982 | A | | 8/2016 | |
| KR | 10-1786966 | B1 | | 10/2017 | |
| KR | 10-2018-0068626 | A | | 6/2018 | |

OTHER PUBLICATIONS

Written Opinion ofthe International Search Authority dated Jun. 21, 2022 in International Application No. PCT/KR2021/002995.

Office Action dated Jul. 25, 2023 issued in European Application No. 21788638.1.

Office Action dated Feb. 3, 2025 issued in European Patent Application No. 21788638.1.

Office Action dated Apr. 29, 2025 issued in Korean Patent Application No. 10-2020-0058399.

* cited by examiner

REFRIGERATOR

CROSS-REFERENCE TO RELATED APPLICATION

This application is a continuation application, under 35 U.S.C. § 111(a), of international application No. PCT/KR2021/002995, filed on Mar. 11, 2021, which claims priority under 35 U.S.C. § 119 to Korean Patent Application No. 10-2020-0046986, filed on Apr. 17, 2020, and Korean Patent Application No. 10-2020-0058399, filed on May 15, 2020 the disclosures of which are incorporated herein by reference in their entireties.

BACKGROUND

Field

The disclosure relates to refrigerator, and more particularly, to a refrigerator capable of adjusting a level difference between doors.

Description of the Related Art

Generally, a refrigerator is a device for storing food at a low temperature, and may store food in frozen or refrigerated state depending on the type of food to be stored.

Such a refrigerator may include a cabinet including an internal space partitioned into a refrigerator compartment and a freezer compartment, and a door disposed at the front of the cabinet and configured to selectively open and close the internal space of the cabinet.

The upper and lower ends of the door may be supported by the upper and lower hinges, respectively, so that the door is opened and closed with respect to the front of the cabinet.

In the case of a double door refrigerator, a level difference may occur between the left door and the right door.

When a consumer purchases a refrigerator having a level difference between the left door and the right door, the consumer requests a return, which increases the manufacturing cost of the refrigerator.

SUMMARY

According to an embodiment of the disclosure, a refrigerator may include a cabinet; a door configured to open or close the cabinet; a fixing bracket fixed to the cabinet; a moving bracket under the fixing bracket to be movable with respect to the fixing bracket; a hinge bracket fixed to the moving bracket and including a hinge shaft rotatably coupled to a lower end of the door; and a hinge shaft adjuster configured to move the moving bracket in a forward direction or a backward direction with respect to a front surface of the cabinet.

The hinge shaft adjuster may include a fixing part extending vertically from the fixing bracket; and a front and rear adjusting bolt fastened to the fixing part and configured to move the moving bracket in the forward direction or the backward direction with respect to the front surface of the cabinet.

The front and rear adjusting bolt may include a hooking groove. The moving bracket may include a hooking portion hooked on the hooking groove of the front and rear adjusting bolt. While the hooking portion of the moving bracket is hooked on the hooking groove of the front and rear adjusting bolt and in response to turning the front and rear adjusting bolt, the moving bracket may be moved in the forward direction or the backward direction with respect to the fixing bracket.

The fixing bracket may include a plurality of female screws on the fixing part. The moving bracket may include a plurality of elongated holes corresponding to the plurality of female screws, the plurality of elongated holes formed to be elongated in a direction perpendicular to the front surface of the cabinet. The fixing bracket and the moving bracket may be coupled by fastening a plurality of bolts to the corresponding plurality of female screws through the corresponding plurality of elongated holes.

The plurality of female screws may include two female screws formed on a left side of the fixing part and a right side of the fixing part, respectively, the plurality of elongated holes may include two elongated holes corresponding to the two female screws, the plurality of bolts may include two bolts, and the fixing bracket and the moving bracket may be coupled by fastening the two bolts to the corresponding two female screws through the corresponding two elongated holes.

The hinge bracket may include a hinge support portion fixed to the moving bracket; and a hinge portion extending vertically from the hinge support portion and on which the hinge shaft is formed.

The cabinet may include a bracket installation part on which the fixing bracket is installed; and an adjuster accommodating part having a step in front of the bracket installation part, and in which the hinge shaft adjuster is accommodated.

In response to rotating the hinge shaft adjuster in a first direction, the moving bracket may move to the front direction with respect to the front surface of the cabinet, and in response to rotating the hinge shaft adjuster in a second direction, the moving bracket may move to the rear direction with respect to the front surface of the cabinet.

According to an embodiment of the disclosure, a refrigerator may include a cabinet, a hinge shaft fixed to the cabinet; a door configured to open or close the cabinet, the door including a lower frame part; an upper moving plate on an upper surface of the lower frame part of the door and movable with respect to the lower frame part; a lower moving plate on a lower surface of the lower frame part of the door, including a hinge hole formed therein and into which the hinge shaft is inserted, and coupled to the upper moving plate so that the lower moving plate moves integrally with the upper moving plate; and a hinge hole adjuster configured to move the upper moving plate or the lower moving plate in a forward direction or a rearward direction with respect to a front surface of the cabinet.

The hinge hole adjuster may include a fixing groove formed in the lower frame part of the door and including a hooking portion; and a front and rear adjusting bolt rotatable with respect to the hooking portion of the fixing groove and configured to move the lower moving plate in the forward direction or the rearward direction back and forth with respect to the front surface of the cabinet.

The front and rear adjusting bolt may include a hooking groove on which the hooking portion of the fixing groove is hooked. The lower moving plate may include a fixing part to which the front and rear adjusting bolt are fastened. While the hooking portion of the fixing groove is hooked on the hooking groove of the front and rear adjusting bolt and in response to turning the front and rear adjusting bolt, the lower moving plate and the upper moving plate may be moved the forward direction or the rearward direction with respect to the lower frame part.

The upper moving plate and the lower moving plate may be coupled with a plurality of bolts. The lower frame part of the door may include a plurality of guide holes through which the plurality of bolts pass. The plurality of guide holes may be formed as elongated holes that are elongated in a direction perpendicular to a front surface of the door.

The refrigerator may include a plurality of sleeves inserted into the plurality of guide holes and through which the plurality of bolts pass. The plurality of sleeves may be fixed between the upper moving plate and the lower moving plate by the plurality of bolts.

The refrigerator may include a reinforcing plate above the upper moving plate and has a plurality of screw holes formed therein and to which the plurality of bolts are fastened.

The hinge hole adjuster may include a fixing member on the lower frame part of the door and including a hooking portion; and a front and rear adjusting bolt rotatable with respect to the hooking portion of the fixing member and moves the upper moving plate or the lower moving plate in the forward direction or the rearward with respect to the front surface of the door.

The front and rear adjusting bolt may include a hooking groove hooked on the hooking portion of the fixing member. The lower moving plate includes a fixing part to which the front and rear adjusting bolt is fastened. While the hooking portion of the fixing member is hooked on the hooking groove of the front and rear adjusting bolt and in response to turning the front and rear adjusting bolt, the lower moving plate and the upper moving plate may be moved in the forward direction or the rearward with respect to the lower frame part of the door.

The front and rear adjusting bolt may include a hooking groove hooked on the hooking portion of the fixing member. The upper moving plate may include a fixing part to which the front and rear adjusting bolt is fastened. While the hooking portion of the fixing member is hooked on the hooking groove of the front and rear adjusting bolt and in response to turning the front and rear adjusting bolt, the upper moving plate and the lower moving plate may be moved in the forward direction or the rearward with respect to the lower frame part.

The refrigerator may include a locking member configured to selectively fix the lower moving plate to the lower frame part of the door. The locking member may include a locking bolt or a locking lever.

The locking member may include a locking bolt or a locking lever.

In response to rotating the hinge shaft adjuster in a first direction, the moving bracket may move to the front direction with respect to the front surface of the cabinet, and in response to rotating the hinge shaft adjuster in a second direction, the moving bracket may move to the rear direction with respect to the front surface of the cabinet.

DETAILED DESCRIPTION

Various embodiments of the disclosure will hereinafter be described with reference to the accompanying drawings. However, it is to be understood that embodiments of the disclosure are not limited to the described example embodiments, and include various modifications, equivalents, and/or alternatives according to embodiments of the disclosure. The matters defined herein, such as a detailed construction and elements thereof, are provided to assist in a comprehensive understanding of the present disclosure. Thus, it is apparent that example embodiments may be carried out without those defined matters. Also, well-known functions or constructions are omitted to provide a clear and concise description of example embodiments. Further, dimensions of various elements in the accompanying drawings may be arbitrarily increased or decreased for assisting in a comprehensive understanding.

The terms 'first', 'second', etc. may be used to describe diverse components, but the components are not limited by the terms. The terms may only be used to distinguish one component from the others. For example, without departing from the scope of the disclosure, a first component may be referred to as a second component, and similarly, a second component may also be referred to as a first component.

The terms used in embodiments of the disclosure may be construed as commonly known to those skilled in the art unless otherwise defined.

Further, the terms 'leading end', 'rear end', 'upper side', 'lower side', 'top end', 'bottom end', etc. used in the disclosure are defined with reference to the drawings. However, the shape and position of each component are not limited by the terms.

Hereinafter, non-limiting example embodiments of a refrigerator according to the disclosure will be described with reference to the accompanying drawings.

An embodiment of the disclosure is to provide a refrigerator capable of adjusting a level difference between a left door and a right door.

In a refrigerator provided with a hinge according to an embodiment having a structure as described above, a hinge shaft may be moved back and forth with respect to a front surface of a cabinet, so that a level difference between a left door and a right door may be adjusted.

In addition, in a refrigerator provided with a hinge hole assembly according to an embodiment having a structure as described above, a door on which the hinge hole assembly is disposed may be moved back and forth with respect to a front surface of a cabinet, so that a level difference between a left door and a right door may be adjusted.

Figure 1:
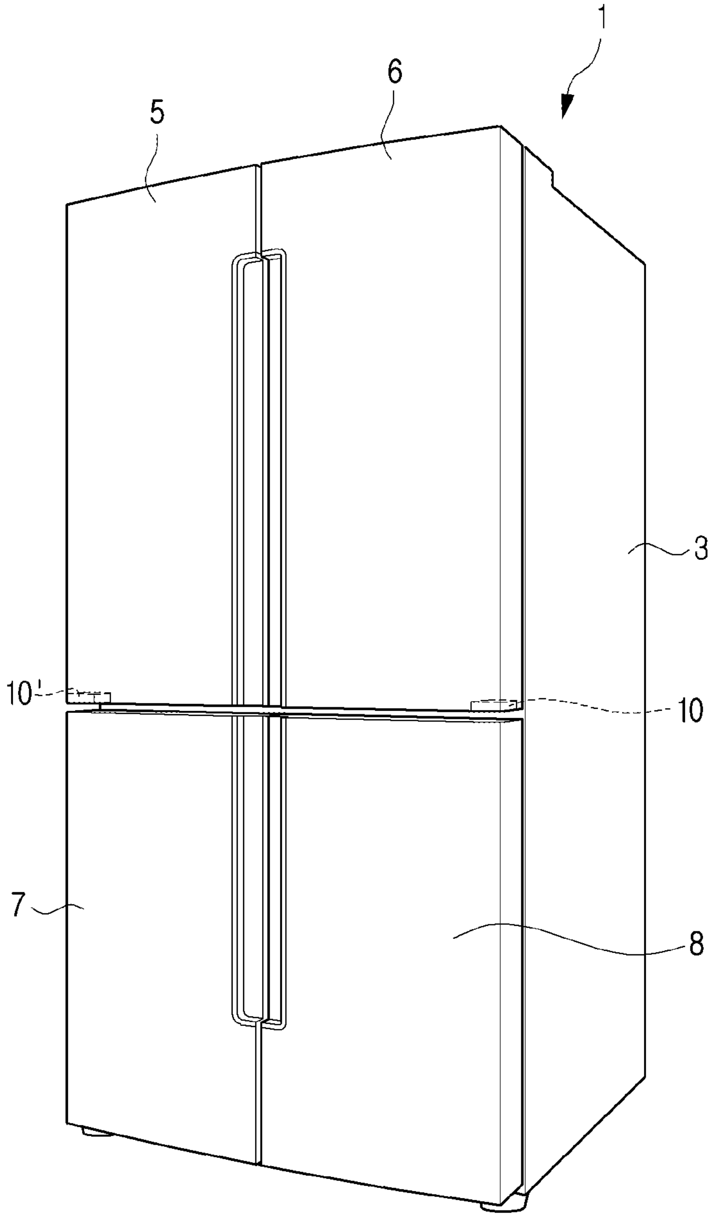
FIG. 1 is a perspective view illustrating a refrigerator according to an embodiment.

FIG. 1 is a perspective view illustrating a refrigerator according to an embodiment.

Referring to FIG. 1, a refrigerator 1 according to an embodiment may include a cabinet 3 and two pairs of doors 5, 6, 7, and 8.

The cabinet 3 may form the exterior of the refrigerator 1. The inner space of the cabinet 3 may be divided into a freezer compartment (not illustrated) for freezing and storing food and a refrigerator compartment (not illustrated) for refrigerating and storing food. In the refrigerator 1 illustrated in FIG. 1, an upper freezer compartment and a lower freezer compartment are provided on the left side of the refrigerator 1, and an upper refrigerator compartment and a lower refrigerator compartment are provided on the right side thereof.

The two pairs of doors, that is, a pair of upper doors 5 and 6 and a pair of lower doors 7 and 8 are disposed on the front surface of the cabinet 3.

The pair of upper doors 5 and 6 includes an upper left door 5 and an upper right door 6. The upper left door 5 is rotatably disposed on the upper left side of the front surface of the cabinet 3 to selectively open and close the upper freezer compartment. The upper right door 6 is rotatably disposed on the upper right side of the front surface of the cabinet 3 to selectively open and close the upper refrigerator compartment.

The pair of lower doors 7 and 8 includes a lower left door 7 and a lower right door 8. The lower left door 7 is rotatably disposed on the lower left side of the front surface of the cabinet 3 to selectively open and close the lower freezer compartment. The lower right door 8 is rotatably disposed on the lower right side of the front surface of the cabinet 3 to selectively open and close the lower refrigerator compartment.

The upper left door 5 and the upper right door 6 are disposed so that the upper and lower ends are supported by hinges, respectively, so that the upper left door 5 and the upper right door 6 may be opened and closed with respect to the front surface of the cabinet 3. An upper left hinge (not illustrated) is disposed on the left side of the upper surface of the cabinet 3 to allow the upper left door 5 to be opened and closed with respect to the front surface of the cabinet 3. An upper right hinge (not illustrated) is disposed on the right side of the upper surface of the cabinet 3 to allow the upper right door 6 to be opened and closed with respect to the front surface of the cabinet 3.

A lower left hinge 10' is disposed in the middle of the left side of the front surface of the cabinet 3 to support the lower surface of the upper left door 5 so that the upper left door 5 may be opened and closed with respect to the front surface of the cabinet 3. A lower right hinge 10 is disposed in the middle of the right side of the front surface of the cabinet 3 to support the lower surface of the upper right door 6 so that the upper right door 6 may be opened and closed with respect to the front surface of the cabinet 3.

Because the lower left hinge 10' disposed on the lower portion of the upper left door 5 and the lower right hinge 10 disposed on the lower portion of the upper right door 6 may be formed in the same structure, hereinafter, the lower right hinge 10 will be described as an example. However, there is a difference in that the lower right hinge 10 has a structure that is linearly symmetric with the lower left hinge 10'. Hereinafter, for convenience of description, the lower right hinge 10 will be referred to as a hinge.

Figure 2:
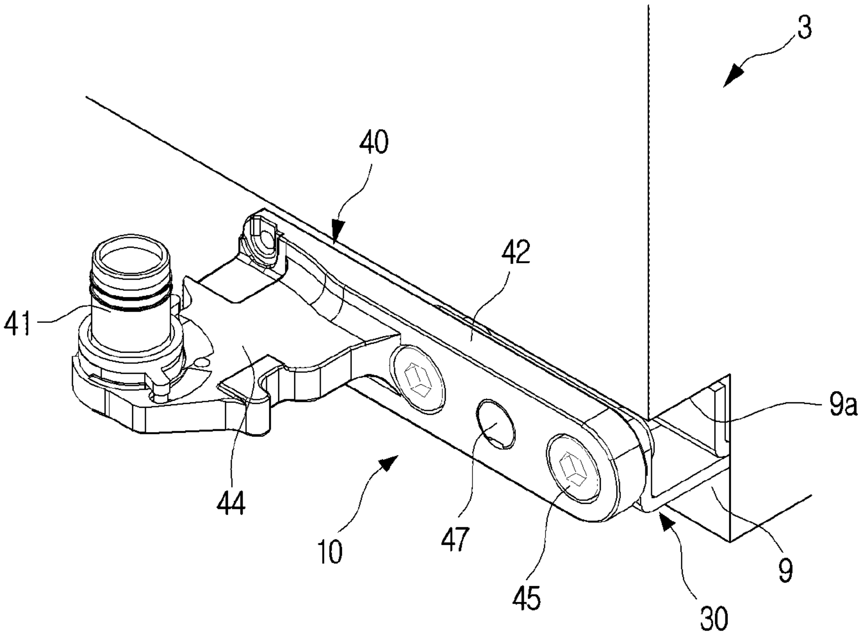
FIG. 2 is a partial perspective view of a refrigerator on which a hinge is disposed according to an embodiment.
Figure 3:
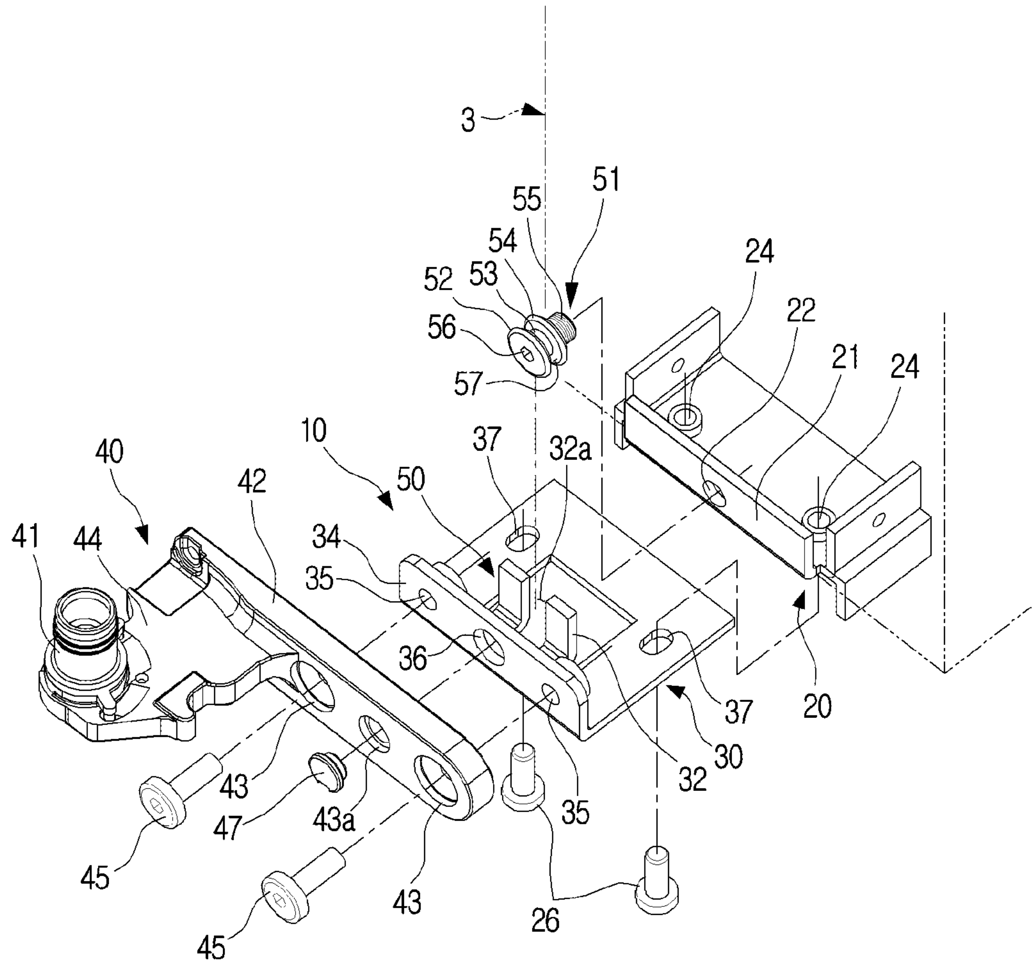
FIG. 3 is an exploded perspective view illustrating the hinge of FIG. 2.
Figure 4:
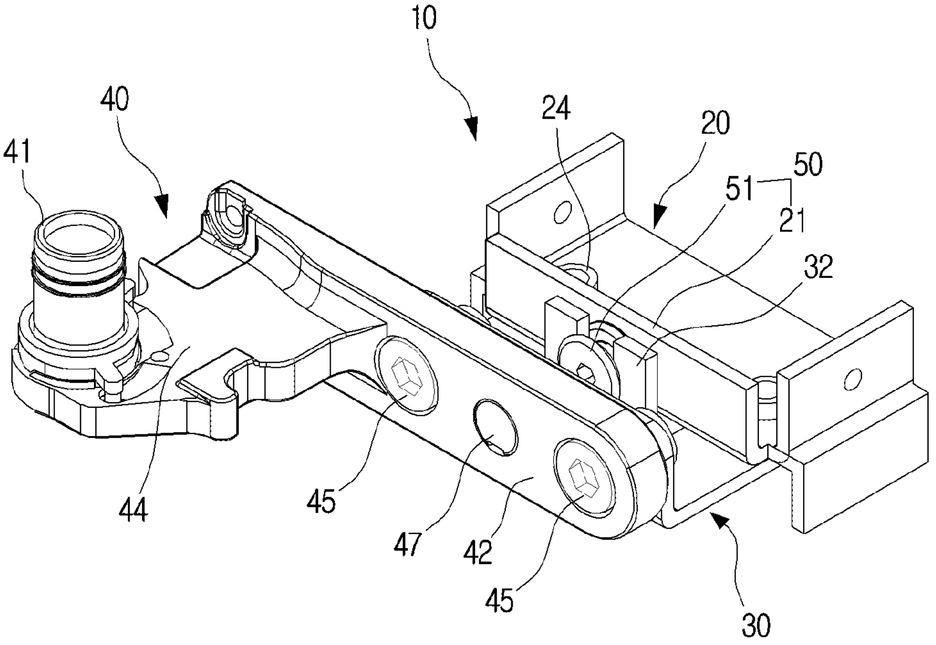
FIG. 4 is a perspective view illustrating a hinge according to an embodiment.

FIG. 2 is a partial perspective view of a refrigerator on which a hinge is disposed according to an embodiment, and FIG. 3 is an exploded perspective view illustrating the hinge of FIG. 2. FIG. 4 is a perspective view illustrating a hinge according to an embodiment. For reference, FIG. 4 is illustrated in a state in which a fixing bracket is separated from a cabinet in order to show a coupling state of the fixing bracket and a moving bracket.

Referring to FIGS. 2 to 4, the hinge 10 according to an embodiment may include a fixing bracket 20, a moving bracket 30, a hinge bracket 40, and a hinge shaft adjuster 50.

The fixing bracket 20 is disposed in the cabinet 3. For example, the fixing bracket 20 may be fixed to a bracket installation part 9 provided in the middle of the right side of the front surface of the cabinet 3. Accordingly, the fixing bracket 20 may not move relative to the cabinet 3.

The fixing bracket 20 may be formed to be fixed to the upper surface of the bracket installation part 9 of the cabinet 3 when the cabinet 3 is formed by foaming. As another example, the fixing bracket 20 may be disposed in the bracket installation part 9 of the cabinet 3 using a fastening member as bolts.

In addition, an adjuster accommodating part 9*a* forming a step with respect to the bracket installation part 9 may be provided in front of the bracket installation part 9 of the cabinet 3.

The fixing bracket 20 may include a fixing part 21 and a plurality of fastening parts 24. The fixing part 21 may extends substantially vertically from the fixing bracket 20, and may be provided with an adjusting bolt hole 22 to which a front and rear adjusting bolt 51 is fastened.

The plurality of fastening parts 24 are formed so that a plurality of screws or bolts 26 for fixing the moving bracket 30 to the fixing bracket 20 may be fastened to the plurality of fastening parts 24. For example, the plurality of fastening parts 24 may be formed as female screws. In this embodiment, the plurality of fastening parts 24 are formed as two female screws that are provided to be spaced apart from each other by a predetermined distance to the left and right of the fixing part 21.

Referring to FIG. 3, the front and rear adjusting bolt 51 may include a head 52, a body 53, and an intermediate ring 54.

The head 52 may be formed to turn the front and rear adjusting bolt 51. For example, a hexagonal grooves 56 into which a hexagonal wrench is inserted may be formed in the surface of the head 52.

The body 53 extends vertically from the lower surface of the head 52 and is formed in a cylindrical shape. A threaded portion 55 having a male thread is provided at a lower portion of the body 53. The threaded portion 55 may be formed from one end of the body 53 to the intermediate ring 54. The threaded portion 55 of the front and rear adjusting bolt 51 is formed to be fastened to the adjusting bolt hole 22 of the fixing bracket 20. Accordingly, the threaded portion 55 of the front and rear adjusting bolt 51 may be fastened to the female screw of the adjusting bolt hole 22 of the fixing bracket 20.

The intermediate ring 54 is formed in the body 53 so as to be spaced apart by a predetermined distance from the head 52. The gap between the intermediate ring 54 and the head 52 forms a hooking groove 57. The hooking groove 57 is formed so that a hooking portion 32 of the moving bracket 30 may be inserted into the hooking groove 57. The hooking portion 32 may be formed so that when the hooking portion 32 is inserted into the hooking groove 57 of the front and rear adjusting bolt 51, the hooking portion 32 does not move with respect to the hooking groove 57.

The moving bracket 30 may be disposed below the fixing bracket 20 to be movable with respect to the fixing bracket 20. The moving bracket 30 may include the hooking portion 32 hooked on the hooking groove 57 of the front and rear adjusting bolt 51. The hooking portion 32 may be formed to extend substantially vertically from the moving bracket 30. For example, the hooking portion 32 may be formed by cutting a portion of the moving bracket 30 into a rectangular shape with one side connected to the moving bracket 30 and bending it at 90 degrees. A groove 32*a* into which the body 53 of the front and rear adjusting bolt 51 is inserted is formed in the hooking portion 32. Both side walls forming the groove 32*a* are inserted into the hooking groove 57 of the front and rear adjusting bolt 51.

The moving bracket 30 may include a hinge fixing part 34 to which the hinge bracket 40 is fixed. The hinge fixing part 34 is spaced apart from the hooking portion 32 by a predetermined distance, and is formed to extend substantially vertically from the front end of the moving bracket 30. The hinge fixing part 34 may be provided with two female screws 35 for fixing the hinge bracket 40.

In addition, the hinge fixing part 34 may be provided with an adjusting hole 36 between the two female screws 35 to allow access to the front and rear adjusting bolt 51. The user may insert the hexagonal wrench into the hexagonal groove 56 of the head 52 of the front and rear adjusting bolt 51 through the adjusting hole 36.

The moving bracket 30 may include a plurality of elongated holes 37 corresponding to the plurality of fastening parts 24 of the fixing bracket 20. For example, the moving bracket 30 may include two elongated holes 37 provided to correspond to the two female screws 24 of the fixing bracket 20. The two elongated holes 37 are formed to be elongated in a direction perpendicular to the front surface of the cabinet 3. Accordingly, the moving bracket 30 may move with respect to the fixing bracket 20 in a direction perpendicular to the front surface of the cabinet 3.

The moving bracket 30 is coupled to the fixing bracket 20 with two bolts 26. In detail, the moving bracket 30 is fixed to the fixing bracket 20 by the two bolts fastened to the two female screws 24 of the fixing bracket 20 through the two elongated holes 37.

The hinge bracket 40 is disposed on the moving bracket 30 and includes a hinge shaft 41 rotatably coupled to the lower end of the door 6. The hinge bracket 40 includes a hinge support portion 42 corresponding to the hinge fixing part 34 of the moving bracket 30 and a hinge portion 44 extending vertically from the hinge support portion 42.

The hinge shaft 41 is formed vertically from the hinge portion 44. The hinge shaft 41 is formed so as to be inserted into a hinge hole 6*a* (see FIG. 5B) provided on the lower surface of the door 6. Accordingly, the door 6 may rotate about the hinge shaft 41.

The hinge support portion 42 is provided with a central hole 43*a* corresponding to the adjusting hole 36 of the hinge fixing part 34. A cap 47 may be installed in the central hole 43*a* corresponding to the adjusting hole 36 of the moving bracket 30. Then, the front and rear adjusting bolt 51 may be prevented from being exposed through the central hole 43*a* and the adjusting hole 36.

In addition, the hinge support portion 42 is provided with two bolt seats 43 corresponding to the two female screws 35 of the hinge fixing part 34, and in which the two bolts 45 are received. When the two bolts 45 inserted into the two bolt seats 43 and fastened to the two female screws 35 of the hinge fixing part 34 of the moving bracket 30, the hinge bracket 40 is fixed to the moving bracket 30. Then, the hinge bracket 40 may move integrally with the moving bracket 30.

The hinge shaft adjuster 50 is formed to move the moving bracket 30 in the front-rear direction with respect to the front surface of the cabinet 3. For example, the hinge shaft adjuster 50 may include the fixing part 21 extending vertically from the fixing bracket 20 and the front and rear adjusting bolt 51 that is fastened to the fixing part 21 and moves the moving bracket 30 back and for the with respect to the front surface of the cabinet 3.

Therefore, when the front and rear adjusting bolt 51 is turned in a state in which the hooking portion 32 of the moving bracket 30 is hooked on the hooking groove 57 of the front and rear adjusting bolt 51, the moving bracket 30 may be moved back and forth with respect to the fixing bracket 20, that is, the front surface of the cabinet 3. When the moving bracket 30 is moved back and forth with respect to front surface of the cabinet 3, the hinge shaft 41 of the hinge bracket 40 fixed to the moving bracket 30 also moves integrally.

Hereinafter, a method of adjusting the level difference of the door 5 using the hinge 10 according to an embodiment of the disclosure will be described in detail with reference to FIGS. 5A and 6B.

Figure 5A:
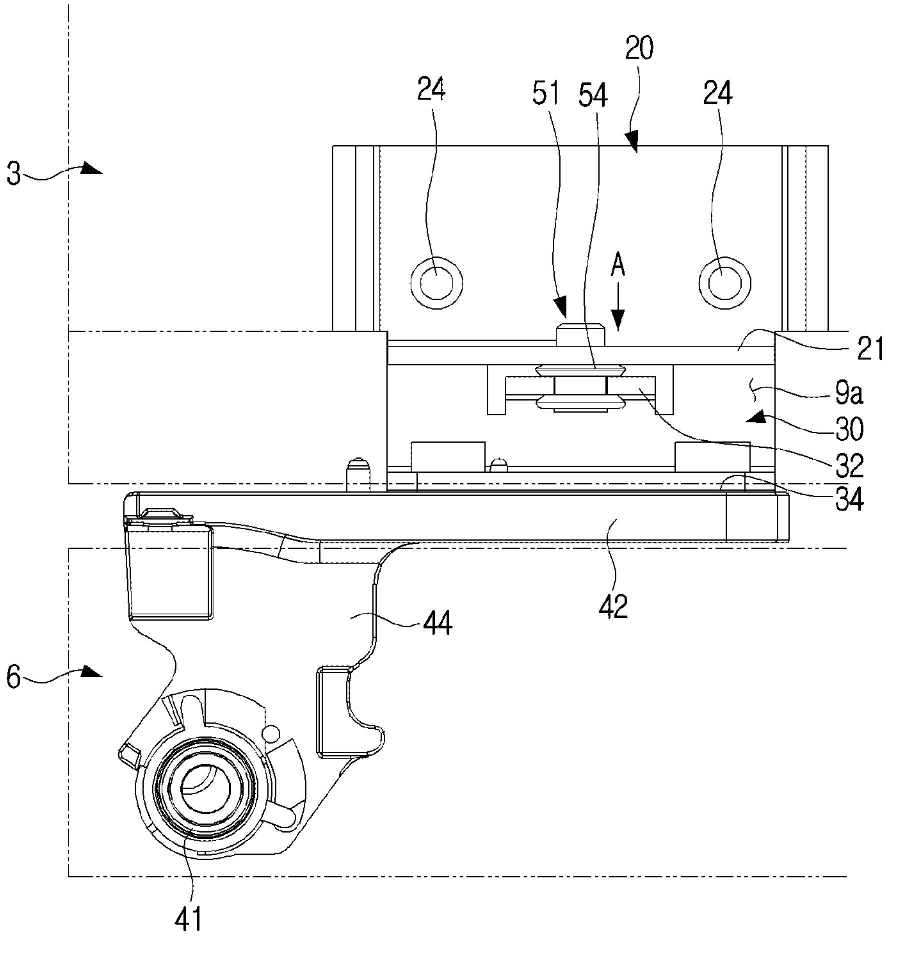
FIGS. 5A and 5B are a plan view and a side view illustrating a state in which a hinge shaft is closest to a cabinet.
Figure 5B:
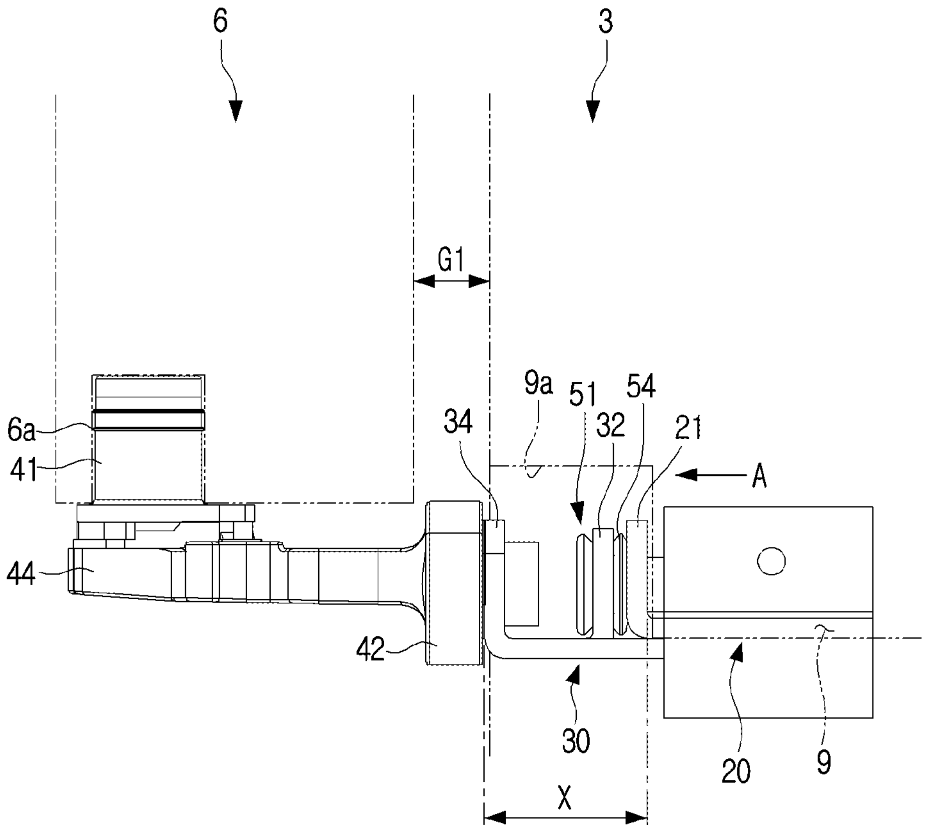
Figure 6A:
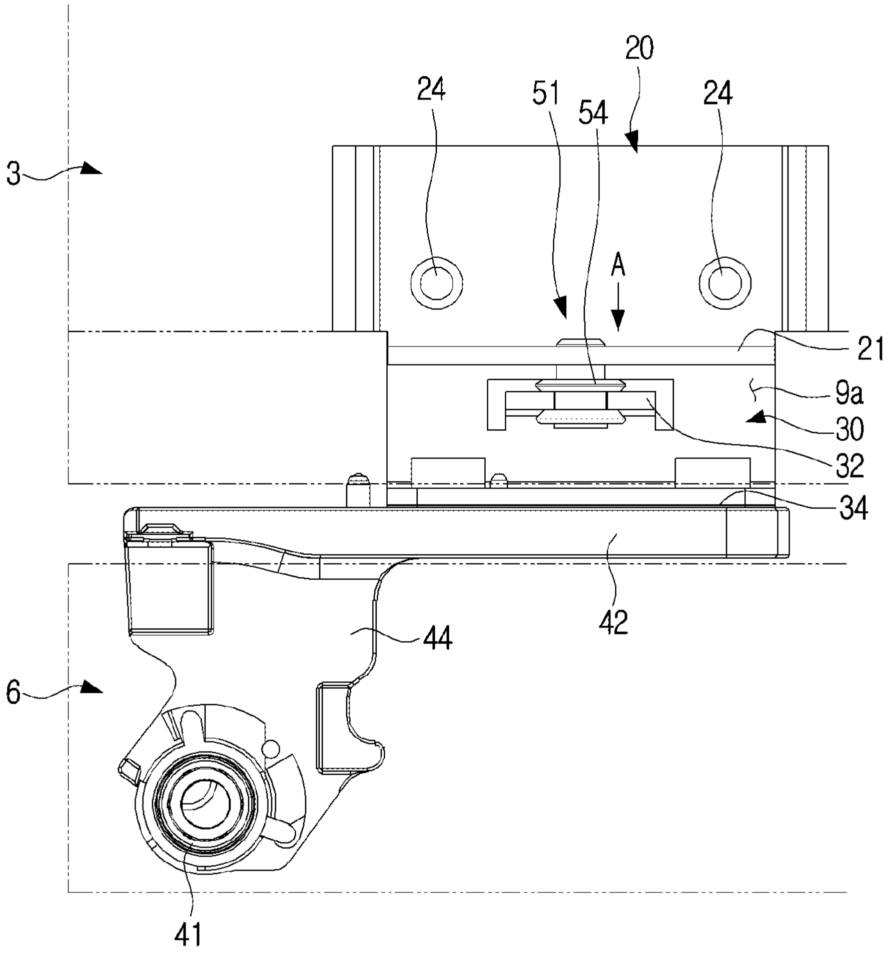
FIGS. 6A and 6B are a plan view and a side view illustrating a state in which a hinge shaft is moved away from a cabinet.

FIGS. 5A and 5B are a plan view and a side view illustrating a state in which a hinge shaft is closest to a cabinet. FIGS. 6A and 6B are a plan view and a side view illustrating a state in which a hinge shaft is moved away from a cabinet.

Referring to FIGS. 5A and 5B, the intermediate ring 54 of the front and rear adjusting bolt 51 is in contact with the fixing part 21 of the fixing bracket 20. In this case, the hinge shaft 41 is located closest to the fixing part 21 of the fixing bracket 20. In other words, the hinge shaft 41 is the closest to the front surface of the cabinet 3. Accordingly, the gap between the door 6 supported by the hinge shaft 41 and the cabinet 3 is minimized. At this time, the distance between the front surface of the moving bracket 30 and the rear surface of the fixing part 21 of the fixing bracket 20 may be referred to as X.

In this state, when the front and rear adjusting bolt 51 are rotated, the gap G1 between the door 6 and the cabinet 3 may be adjusted. For example, the user may insert a hexagonal wrench into the hexagonal groove 56 of the front and rear adjusting bolt 51 through the central hole 43*a* of the hinge bracket 40 and the adjusting hole 36 of the moving bracket 30, and turn the front and rear adjusting bolt 51 in one direction.

When the front and rear adjusting bolt 51 is rotated in one direction, the intermediate ring 54 of the front and rear adjusting bolt 51 is spaced apart from the fixing part 21 of the fixing bracket 20. In detail, because the threaded portion 55 of the front and rear adjusting bolt 51 is fastened to the adjusting bolt hole 22 of the fixing part 21 of the fixing bracket 20, when the front and rear adjusting bolt 51 is turned in one direction, the front and rear adjusting bolt 51 is moved in the A direction. When the front and rear adjusting bolt 51 is moved in the A direction, the hooking portion 32 of the moving bracket 30 caught in the hooking groove 57 of the front and rear adjusting bolt 51 is moved in the A direction. Because the hooking portion 32 is integrally formed with the moving bracket 30, the moving bracket 30 is moved in the A direction. At this time, the distance between the front surface of the moving bracket 30 and the rear surface of the fixing part 21 of the fixing bracket 20 increases by X+D.

On the other hand, because the hinge shaft 41 of the hinge bracket 40 is disposed in the hinge fixing part 34 of the moving bracket 30, the hinge shaft 41 is moved in the A direction. Accordingly, the hinge shaft 41 is moved away from the front surface of the cabinet 3.

Figure 6B:
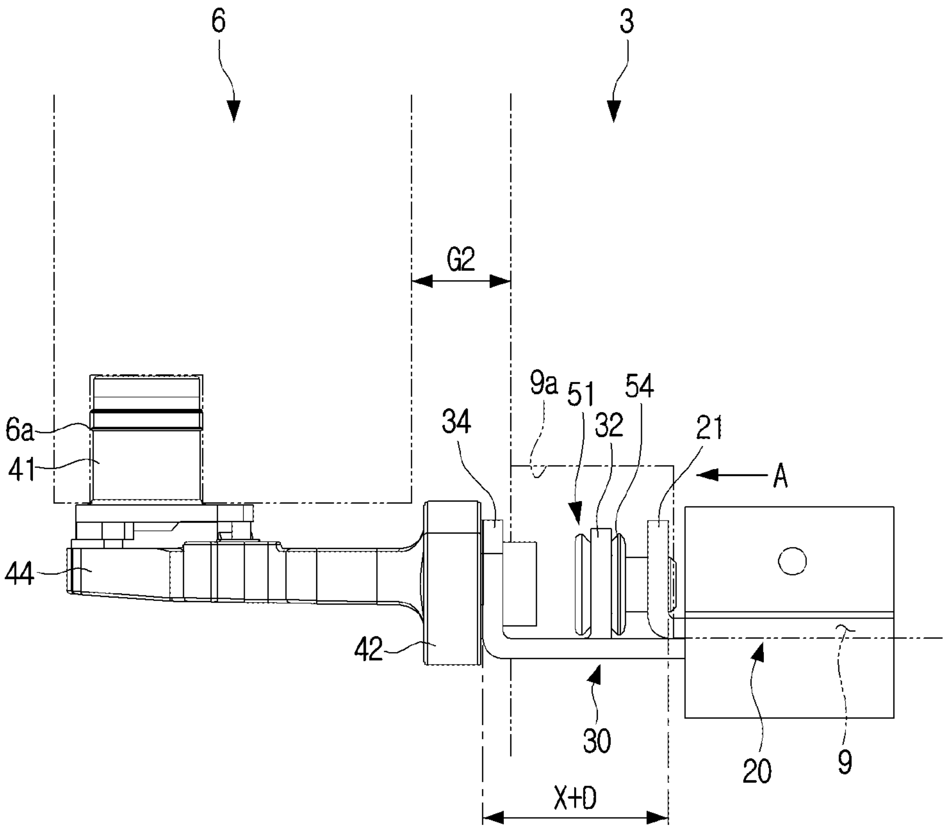

A state in which the hinge shaft 41 is moved away from the cabinet 3 by rotating the front and rear adjusting bolt 51 in one direction is shown in FIGS. 6A and 6B. As described above, when the hinge shaft 41 moves away from the front surface of the cabinet 3, the gap between the door 6 and the front surface of the cabinet 3 increases to become G2 (G2>G1).

When reducing the gap G2 between the rear surface of the door 6 and the front surface of the cabinet 3 in FIGS. 6A and 6B, the front and rear adjusting bolt 51 is rotated in the opposite direction.

In the case of the hinge 10 having the above-described structure, when the front and rear adjusting bolt 51 is rotated, the gap between the rear surface of the door 6 and the front surface of the cabinet 3 may be adjusted. Accordingly, when a level difference occurs between the upper left door 5 and the upper right door 6, the level difference may be removed by moving the upper right door 6 back and forth with respect to the front surface of the cabinet 3 with the front and rear adjusting bolt 51 of the hinge 10.

In the above description, the hinge 10 is configured to move the hinge shaft 41 disposed in the cabinet 3 back and forth with respect to the front surface of the cabinet 3. However, the disclosure is not limited thereto.

As a method of adjusting the gap between the door 6 and the cabinet 3, the hinge disposed in the cabinet 3, that is, the hinge shaft does not move, the hinge hole of the door 6 into which the hinge shaft is inserted may be formed to move back and forth with respect to the front surface of the door 6. Hereinafter, an embodiment of a refrigerator in which a level difference between a door and a cabinet is adjusted by moving a hinge hole provided in door will be described in detail.

Hereinafter, a refrigerator according to an embodiment of the disclosure will be described in detail with reference to FIGS. 7 to 11.

Figure 7:
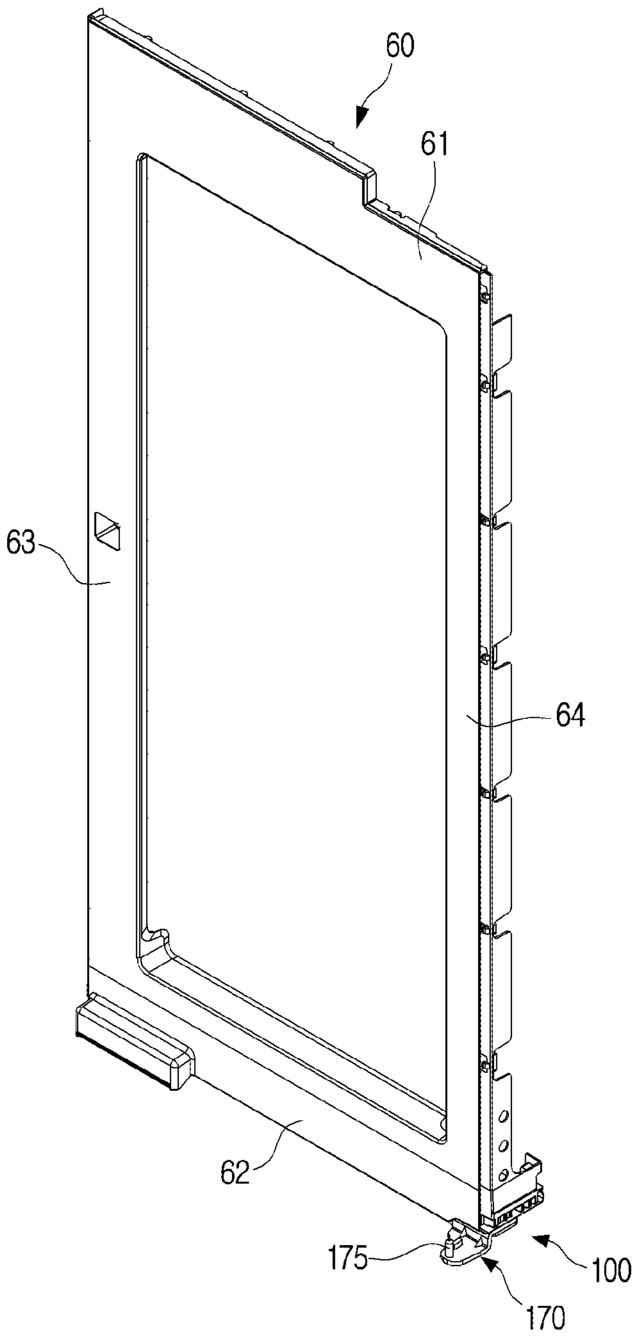
FIG. 7 is a perspective view illustrating a door frame according to an embodiment.

FIG. 7 is a perspective view illustrating a door frame of a refrigerator in which a hinge hole assembly according to an embodiment of the disclosure is disposed.

Referring to FIG. 7, a hinge hole assembly 100 according to an embodiment is disposed on the right side of the lower end of the upper right door 6 (see FIG. 1). The hinge hole assembly 100 includes a hinge hole 121 into which a hinge shaft 102 of a hinge 101 disposed in the cabinet 3 may be inserted. The hinge hole assembly 100 may be formed to move the hinge hole 121 back and forth with respect to the front surface of the door 6.

FIG. 7 discloses only a door frame 60 forming the door 6. The door frame 60 is formed in a rectangular shape and includes an upper frame part 61, a lower frame part 62, a left frame part 63, and a right frame part 64. The hinge hole assembly 100 may be disposed on the right side of the lower frame part 62 of the door 6.

In addition, the door frame 60 of the upper right door 6 illustrated in FIG. 7 further includes a sub-hinge 170 capable of rotatably supporting a sub-door (not illustrated) on the front surface of the door frame 60.

Hereinafter, the hinge hole assembly 100 according to an embodiment disposed in the door frame 60 will be described in detail with reference to FIGS. 8 to 12.

Figure 8:
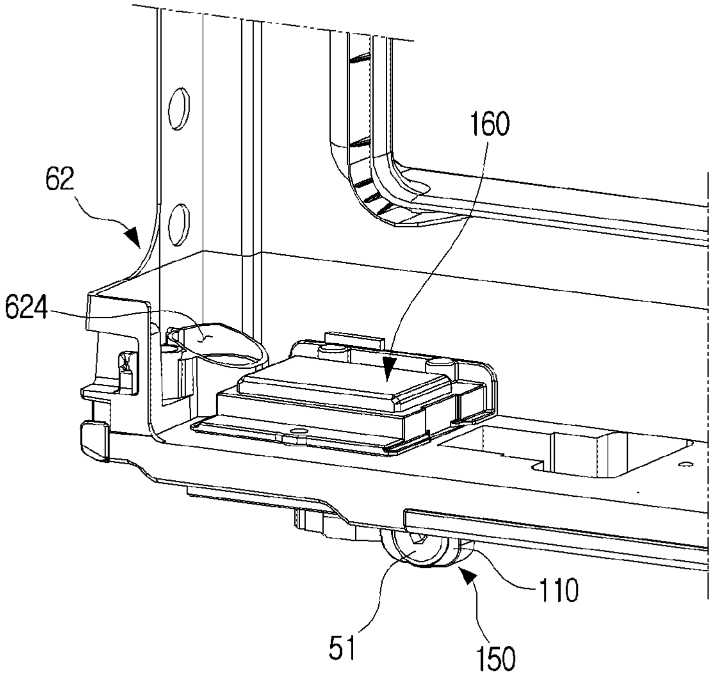
FIG. 8 is a rear perspective view illustrating a hinge hole assembly disposed in the door frame of FIG. 7.
Figure 9:
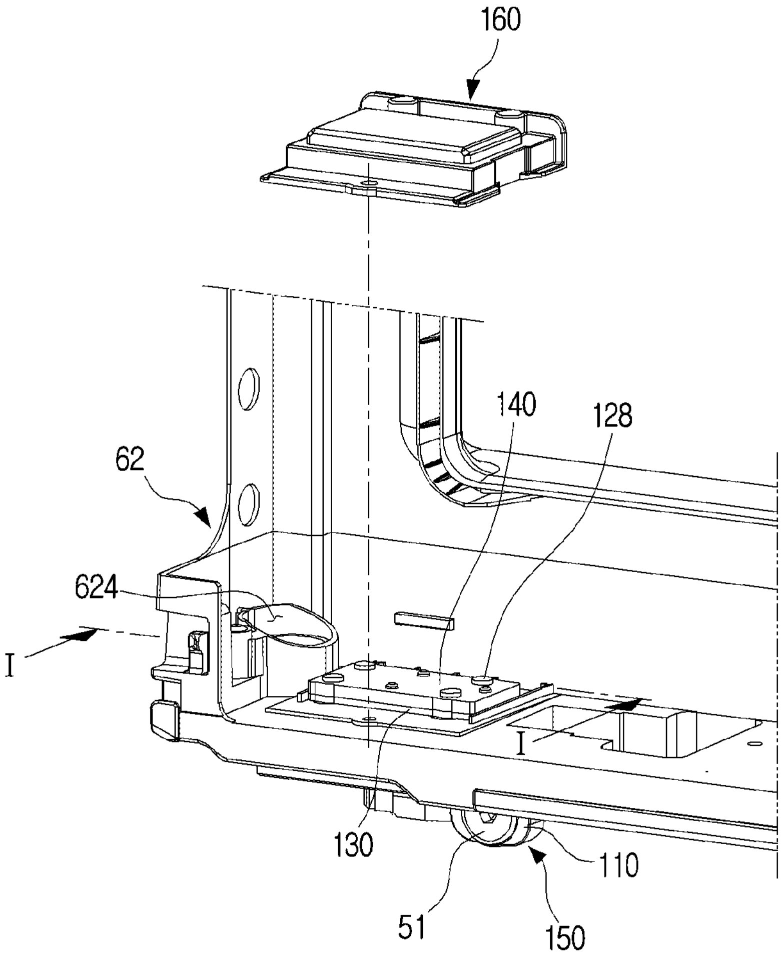
FIG. 9 is a perspective view illustrating a state in which a hinge cover is removed from the hinge hole assembly of FIG. 8.
Figure 10:
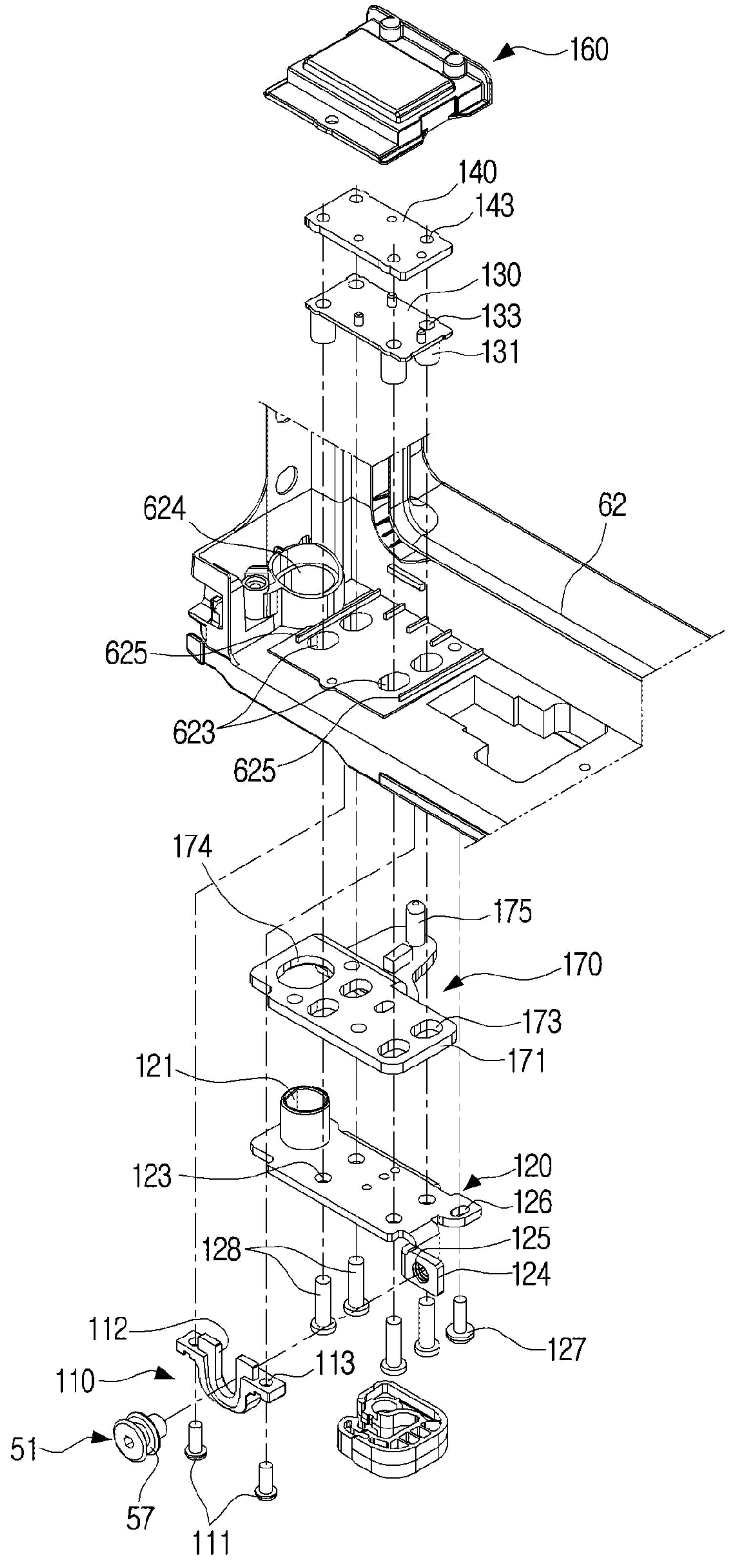
FIG. 10 is an exploded perspective view illustrating the hinge hole assembly of FIG. 9.
Figure 11:
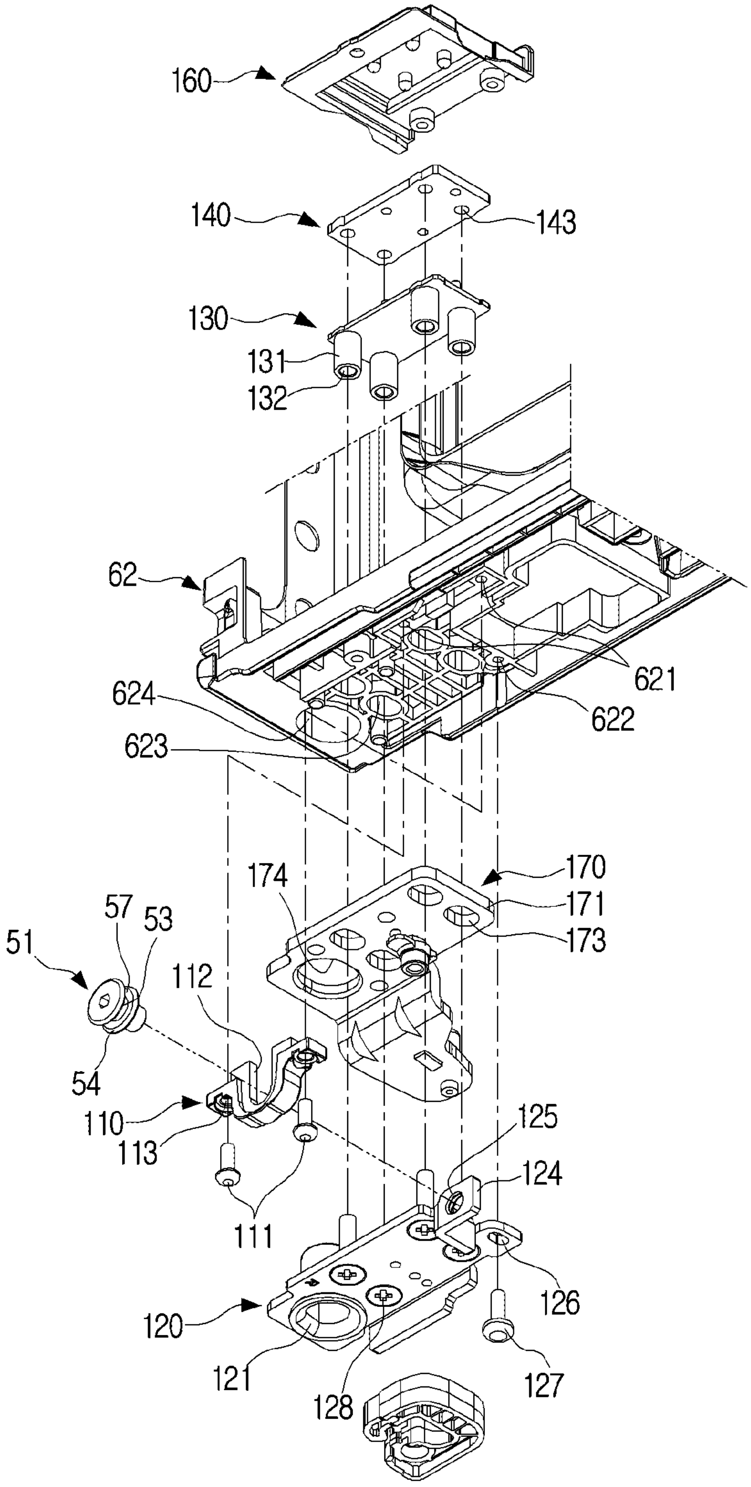
FIG. 11 is an exploded perspective view of the hinge hole assembly of FIG. 9 viewed from below.
Figure 12:
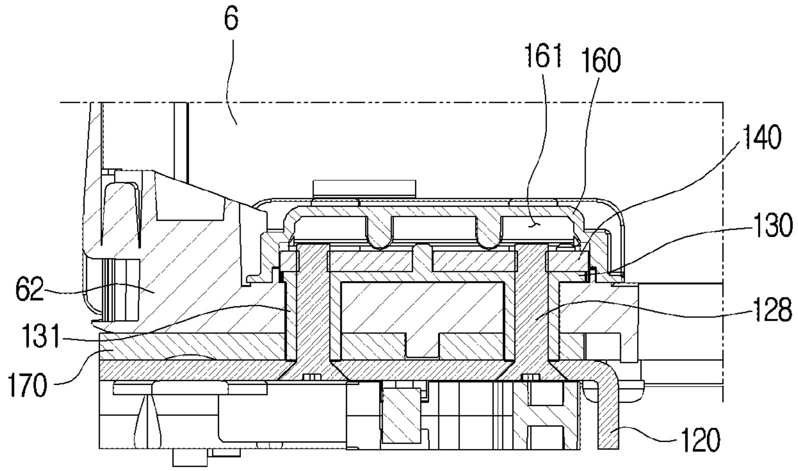
FIG. 12 is a cross-sectional view illustrating the hinge hole assembly of FIG. 9 taken along line □-□.

FIG. 8 is a rear perspective view illustrating a hinge hole assembly disposed in the door frame of FIG. 7. FIG. 9 is a perspective view illustrating a state in which a hinge cover is removed from the hinge hole assembly of FIG. 8. FIG. 10 is an exploded perspective view illustrating the hinge hole assembly of FIG. 9. FIG. 11 is an exploded perspective view of the hinge hole assembly of FIG. 9 viewed from below. FIG. 12 is a cross-sectional view illustrating the hinge hole assembly of FIG. 9 taken along line □-□.

Referring to FIGS. 8 to 12, the hinge hole assembly 100 according to an embodiment may include a fixing member 110, a lower moving plate 120, an upper moving plate 130, and a hinge hole adjuster 150.

The fixing member 110 is fixed to the lower frame 62 of the door. Referring to FIG. 11, in this embodiment, the fixing member 110 is fixed to the lower surface of the lower frame part 62 by two bolts 111. To this end, two fixing holes 113 are provided in the fixing member 110, and two bolt holes 621 to which the bolts 111 may be fastened are proved on the lower surface of the lower frame part 62.

The fixing member 110 includes a hooking portion 112 configured to support the front and rear adjusting bolt 51 to rotate in place without moving in the axial direction. The hooking portion 112 may be formed as a groove into which the body 53 of the front and rear adjusting bolt 51 is inserted. Both side surfaces of the hooking portion 112 may be formed to be inserted into the hooking groove 57 of the front and rear adjusting bolt 51.

The lower moving plate 120 is disposed on the lower surface of the lower frame part 62 and includes a hinge hole 121 into which the hinge shaft 102 is inserted. The hinge hole 121 is formed in a size corresponding to the hinge shaft 102 fixed to the cabinet 3. Accordingly, the lower moving plate 120 does not move with respect to the hinge shaft 102.

The lower moving plate 120 is disposed to be movable with respect to the lower frame part 62. Accordingly, the lower moving plate 120 may move with respect to the fixing member 110 fixed to the lower frame part 62. The lower moving plate 120 is formed to be movable with respect to the lower frame part 62 integrally with the upper moving plate 130.

The lower moving plate 120 includes a plurality of coupling holes 123 for coupling with the upper moving plate 130. In this embodiment, four coupling holes 123 are formed in the lower moving plate 120.

In addition, the lower moving plate 120 may include a locking hole 126 for fixing the lower moving plate 120 to the lower frame part 62. The locking hole 126 is formed as an elongated hole in the moving direction of the lower moving plate 120.

A locking screw hole 622 to which a locking bolt 127 for fixing the lower moving plate 120 is fastened is provided on the lower surface of the lower frame part 62. When the locking bolt 127 is inserted into the locking hole 126 of the lower moving plate 120 and fastened to the locking screw hole 622 of the lower frame part 62, the lower moving plate 120 is fixed to the lower frame part 62. In other words, in this embodiment, the locking bolt 127 is used as a locking member for fixing the lower moving plate 120 to the door frame 60, that is, the door.

In addition, the lower moving plate 120 includes a fixing part 124 to which the front and rear adjusting bolt 51 is fastened. The fixing part 124 extends substantially perpendicular to the lower moving plate 120, and is proved with an adjusting bolt hole 125 to which the front and rear adjusting bolt 51 is fastened. The lower moving plate 120 is disposed so that the fixing part 124 faces the hooking portion 112 of the fixing member 110.

The front and rear adjusting bolt 51 may include a head 52, a body 53, and an intermediate ring 54. The front and rear adjusting bolt 51 is disposed between the hooking portion 112 of the fixing member 110 and the fixing part 124 of the lower moving plate 120. The front and rear adjusting bolt 51 is the same as the front and rear adjusting bolt 51 used in the hinge 10 according to the above-described embodiment. Therefore, a detailed description thereof is omitted.

The upper moving plate 130 is disposed on the upper surface of the lower frame part 62. The upper moving plate 130 is disposed to be movable with respect to the upper surface of the lower frame part 62. The upper moving plate 130 is formed to be movable with respect to the lower frame part 62 integrally with the lower moving plate 120. Accordingly, the lower frame part 62 is positioned between the upper moving plate 130 and the lower moving plate 120.

The upper moving plate 130 includes a plurality of sleeves 131 provided perpendicular to the upper moving plate 130 for coupling with the lower moving plate 120. The plurality of sleeves 131 are provided to correspond to the plurality of coupling holes 123 of the lower moving plate 120. In this embodiment, because the lower moving plate 120 is provided with four coupling holes 123, the upper moving plate 130 is provided with four sleeves 131. The sleeve 131 is provided with a through hole 132 so that the bolt 128 may pass through the sleeve 131. In this embodiment, the plurality of sleeves 131 are integrally formed with the upper moving plate 130, but in another example, the plurality of sleeves 131 may be formed separately from the upper moving plate 130.

The upper moving plate 130 is provided with a plurality of fastening holes 133 corresponding to the plurality of sleeves 131 and through which the plurality of bolts 128 pass. In this embodiment, because four sleeves 131 are provided in the upper moving plate 130, four fastening holes 133 are formed in the upper moving plate 130. The plurality of sleeves 131 may allow the upper moving plate 130 and the lower moving plate 120 to maintain a predetermined distance.

A reinforcing plate 140 may be disposed above the upper moving plate 130. The reinforcing plate 140 is provided with a plurality of screw holes 143 to which the plurality of bolts 128 are fastened. In this embodiment, because the upper moving plate 130 is provided with four fastening holes 133, the reinforcing plate 140 is provided with four screw holes 143 corresponding to thereto. The reinforcing plate 140 may be formed of a metal plate.

Accordingly, when the plurality of bolts 128 are passed through the plurality of coupling holes 123 of the lower moving plate 120, the plurality of sleeves 131, and the plurality of fastening holes 133 of the upper moving plate 130, and are fastened to the plurality of screw holes 143 of the reinforcing plate 140, the lower moving plate 120 is integrally coupled to the upper moving plate 130.

In the above, the upper moving plate 130 and the lower moving plate 120 are coupled using the separate reinforcing plate 140 and the plurality of bolts 128, but the disclosure is not limited thereto. As another example, when the upper moving plate 130 has sufficient strength, a female screw may be formed on the inner surface of each of the plurality of fastening holes 133 of the upper moving plate 130. Then, when the plurality of bolts 128 are fastened to the plurality of fastening holes 133 of the upper moving plate 130, the lower moving plate 120 may be fixed to the upper moving plate 130.

The lower frame part 62 is provided with a plurality of guide holes 623 for guiding the forward and backward movements of the upper moving plate 130 and the lower moving plate 120. The plurality of guide holes 623 may be formed as elongated holes passing through the lower frame part 62. The elongated holes forming the plurality of guide holes 623 are formed to be elongated in the direction perpendicular to the lower frame part 62, that is, the front surface of the door.

The plurality of sleeves 131 of the upper moving plate 130 are inserted into the plurality of guide holes 623, and are formed to slide along both inner surfaces of the guide holes 623, respectively. Accordingly, the upper moving plate 130 may move forward and backward by a predetermined distance with respect to the lower frame part 62 along the plurality of guide holes 623.

A pair of guide protrusions 625 may be provided on both sides of the plurality of guide holes 623 on the upper surface of the lower frame part 62. The pair of guide protrusions 625 are formed to guide the upper moving plate 130 moving back and forth with respect to the lower frame part 62.

In addition, the lower frame part 62 is provided with a door hinge hole 624 into which the hinge shaft 102 is inserted. The door hinge hole 624 is formed as an elongated hole, so that the hinge shaft 102 may move back and forth within the door hinge hole 624. When the hinge shaft 102 is fixed to the cabinet 3 as in this embodiment, the lower frame part 62 in which the door hinge hole 624 is formed may move back and forth with respect to the hinge shaft 102.

The hinge hole adjuster 150 may be formed to move the lower moving plate 120 in the front-rear direction with respect to the front surface of the door, that is, the front surface of the lower frame part 62. In this embodiment, the hinge hole adjuster 150 may include the hooking portion 112 formed perpendicular to the fixing member 110 and the front and rear adjusting bolt 51 which rotates with respect to the hooking portion 112 and moves the lower moving plate 120 back and forth with respect to the lower frame part 62.

Therefore, in the state where the hooking portion 112 of the fixing member 110 is hooked on the hooking groove 57 of the front and rear adjusting bolt 51, when the front and rear adjusting bolt 51 is turned, the lower moving plate 120 is moved back and forth with respect to the lower frame part 62, that is, the door by the front and rear adjusting bolt 51 fastened to the fixing part 124 of the lower moving plate 120.

A hinge cover 160 may be disposed above the upper moving plate 130. The hinge cover 160 is fixed to the upper surface of the lower frame part 62 to form a space 161 in which the upper moving plate 130 may move. Accordingly, when the urethane is filled in the inner space of the door 6, the urethane does not penetrate between the hinge cover 160 and the lower frame part 62.

As illustrated in FIGS. 10 and 11, a sub-hinge 170 supporting a sub-door (not illustrated) may be disposed between the lower frame part 62 and the lower moving plate 120. The sub-hinge 170 may include a sub-hinge plate 171 and a sub-hinge shaft 175.

The sub-hinge plate 171 is formed to be fixed to the lower surface of the lower frame part 62. In other words, the sub-hinge plate 171 forms a portion of the lower surface of the lower frame part 62.

The sub-hinge plate 171 includes a plurality of sub guide holes 173 and a sub door hinge hole 174 corresponding to the plurality of guide holes 623 and the door hinge hole 624 of the lower frame part 62. The plurality of sub guide holes 173 and the sub door hinge hole 174 are formed as elongated holes, respectively.

The sub-hinge shaft 175 is formed perpendicular to the sub-hinge plate 171 and is inserted into a sub hinge hole (not illustrated) provided on the lower surface of the sub-door.

In the case of a refrigerator that does not include the sub-door, the above-described sub-hinge 170 is not disposed between the lower frame part 62 and the lower moving plate 120. In this case, the lower moving plate 120 is directly disposed on the lower surface of the lower frame part 62.

Hereinafter, a method of adjusting the level difference between the doors using the hinge hole assembly 100 according to an embodiment will be described in detail with reference to FIGS. 13A to 14B.

Figure 13A:
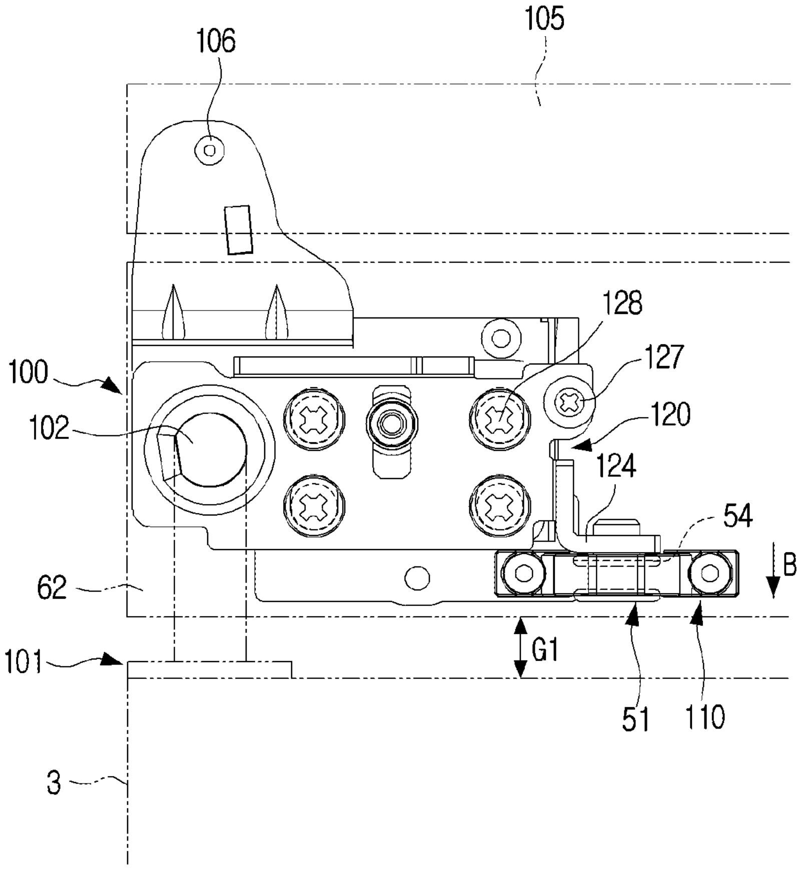
FIGS. 13A and 13B are a bottom view and a side view of a hinge hole assembly illustrating a state which a door is furthest from a cabinet.
Figure 13B:
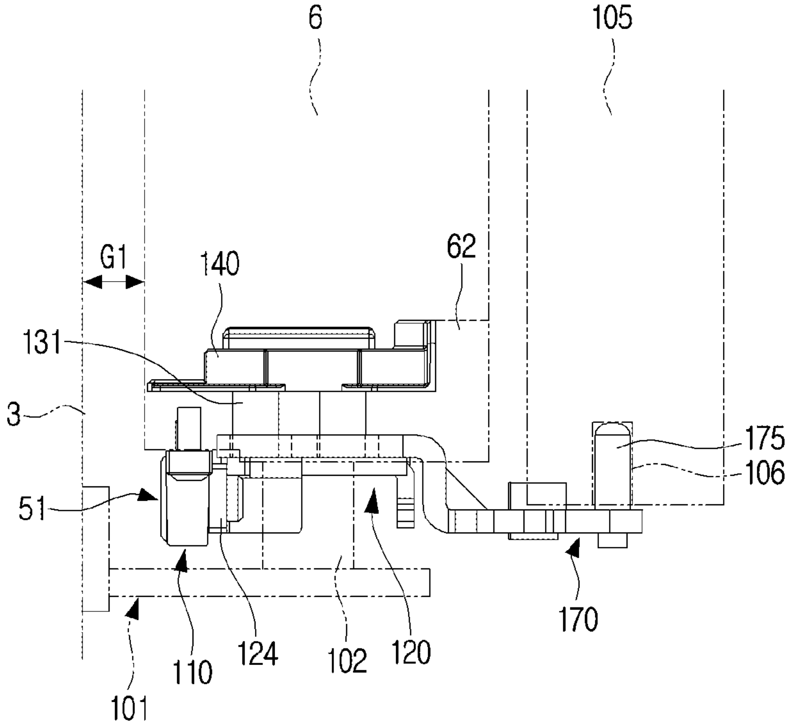
Figure 14A:
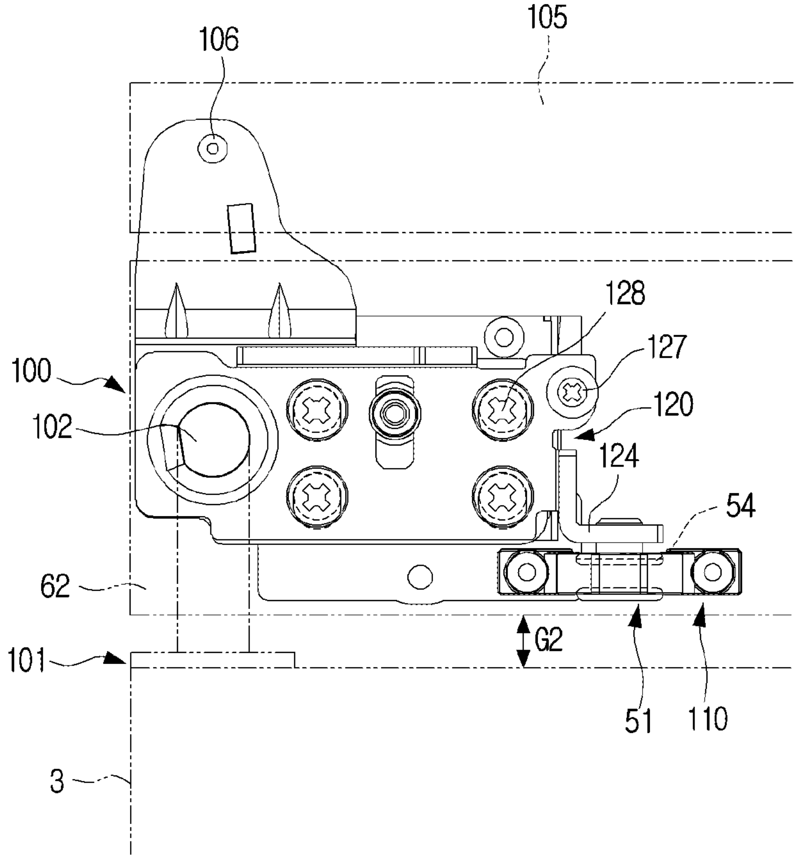
FIGS. 14A and 14B are a bottom view and a side view of a hinge hole assembly illustrating a state which a door is in close proximity to a cabinet.
Figure 14B:
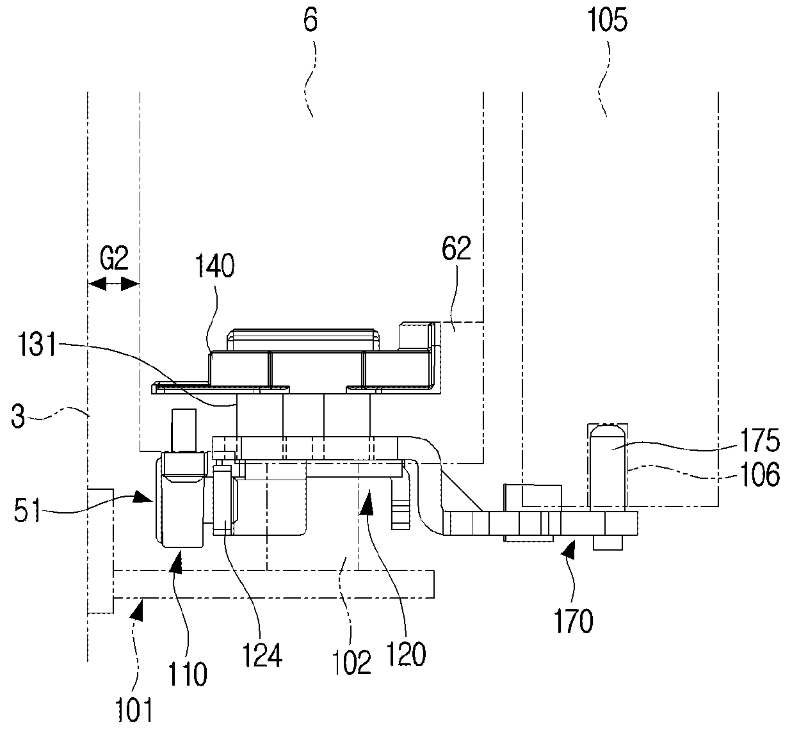

FIGS. 13A and 13B are a bottom view and a side view of a hinge hole assembly illustrating a state which a door is furthest from a cabinet. FIGS. 14A and 14B are a bottom view and a side view of a hinge hole assembly illustrating a state which a door is in close proximity to a cabinet.

Referring to FIGS. 13A and 13B, the intermediate ring 54 of the front and rear adjusting bolt 51 coupled to the fixing member 110 is in contact with the fixing part 124 of the lower moving plate 120. In this case, the gap G1 between the front surface of the cabinet 3 and the rear surface of the door 6 is maximized.

In detail, because the distance between the hinge shaft 102 fixed to the cabinet 3 and the fixing part 124 of the lower moving plate 120 is constant and the fixing member 110 is fixed to the door 6, that is, the lower surface of the lower frame part 62, when the intermediate ring 54 of the front and rear adjusting bolt 51 coupled to the hooking portion 112 of the fixing member 110 comes into contact with the fixing part 124 of the lower moving plate 120, the rear surface of the door 6 is located closest to the fixing part 124 of the lower moving plate 120. Accordingly, the gap G1 between the front surface of the cabinet 3 and the rear surface of the door 6 is maximized.

In this state, when the front and rear adjusting bolt 51 is turned, the distance between the door 6 and the cabinet 3 may be adjusted. For example, the user may insert the hexagonal wrench in the hexagonal groove 56 of the front and rear adjusting bolt 51 and rotate the front and rear adjusting bolt 51 in one direction.

When the front and rear adjusting bolt 51 is rotated in one direction, the fixing part 124 of the lower moving plate 120 is spaced apart from the intermediate ring 54 of the front and rear adjusting bolt 51. In detail, because the threaded portion 55 of the front and rear adjusting bolt 51 is fastened to the adjusting bolt hole 125 of the fixing part 124 of the lower moving plate 120 and the intermediate ring 54 of the front and rear adjusting bolt 51 is hooked on the hooking portion 112 of the fixing member 110, when the front and rear adjusting bolt 51 rotates in one direction, the lower moving plate 120 is moved. However, because the lower moving plate 120 is fixed to the hinge shaft 102 of the hinge 101 disposed in the cabinet 3, the lower moving plate 120 is not moved, and conversely, the fixing member 110 is moved in the B direction. Accordingly, the lower frame part 62 to which the fixing member 110 is fixed, that is, the door 6 moves in the B direction to approach the front surface of the cabinet 3.

A state in which the front and rear adjusting bolt 51 is rotated in one direction to bring the door 6 closer to the front surface of the cabinet 3 is illustrated in FIGS. 14A and 14B. At this time, the gap G2 between the rear surface of the door 6 and the front surface of the cabinet 3 in FIG. 14A is narrower than the gap G1 between the rear surface of the door 6 and the front surface of the cabinet 3 in FIG. 13A (G2<G1).

When the gap G2 between the rear surface of the door 6 and the front surface of the cabinet 3 is to be widened in FIGS. 14A and 14B, the front and rear adjusting bolt 51 is rotated in the opposite direction. When the front and rear adjusting bolt 51 is rotated to the maximum in the opposite direction, the fixing part 124 of the lower moving plate 120 comes into contact with the intermediate ring 54 of the front and rear adjusting bolt 51 as illustrated in FIG. 13A.

In the case of the hinge 101 and the hinge hole assembly 100 having the structure described above, when the front and rear adjusting bolt 51 is rotated, the distance between the door 6 and the cabinet 3 may be adjusted. Accordingly, when a level difference occurs between the upper left door 5 and the upper right door 6, the level difference may be eliminated by moving the upper right door 6 back and forth with respect to the front surface of the cabinet 3 using the front and rear adjusting bolt 51 of the hinge hole assembly 100.

Hereinafter, a hinge hole assembly according to an embodiment disposed on a door will be described in detail with reference to FIGS. 15 to 17.

Figure 15:
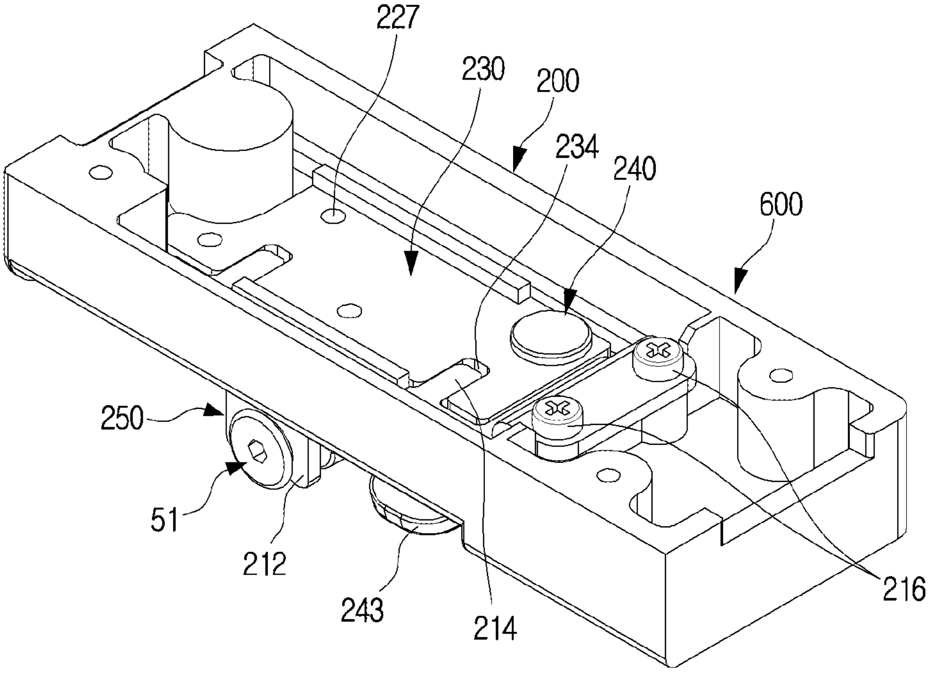
FIG. 15 is a perspective view illustrating a hinge hole assembly according to an embodiment.

FIG. 15 is a perspective view illustrating a hinge hole assembly according to an embodiment. FIG. 16 is an exploded perspective view illustrating the hinge hole assembly of FIG. 15, and FIG. 17 is a bottom view illustrating the hinge hole assembly of FIG. 15.

Figure 16:
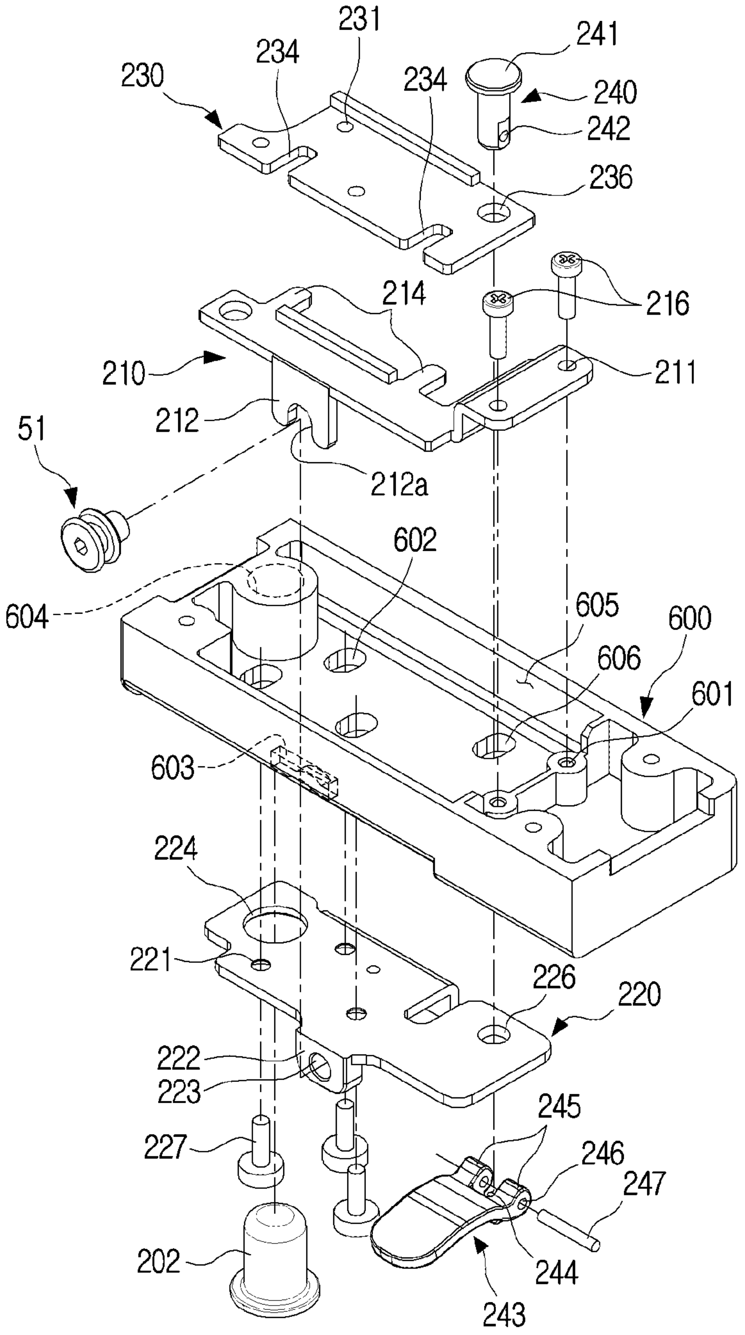
FIG. 16 is an exploded perspective view illustrating the hinge hole assembly of FIG. 15.
Figure 17:
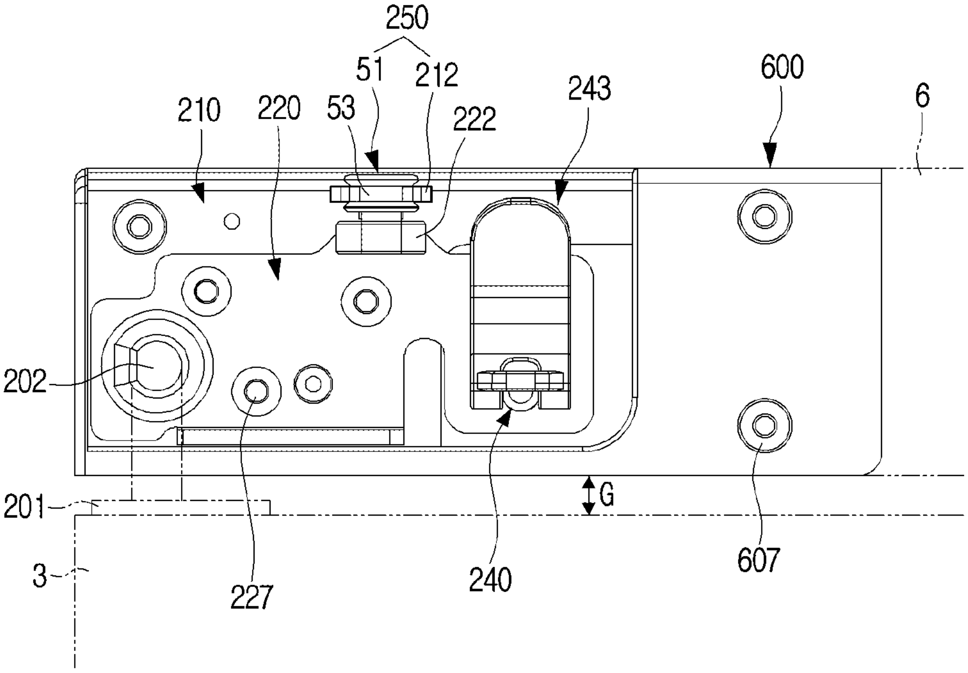
FIG. 17 is a bottom view illustrating the hinge hole assembly of FIG. 15.

Referring to FIGS. 15 to 17, a hinge hole assembly 200 according to an embodiment may include a fixing member 210, a lower moving plate 220, an upper moving plate 230, and a hinge hole adjuster 250.

The fixing member 210 is fixed to a hinge hole housing 600 of the door 6. The hinge hole housing 600 is fixed to the lower frame part of the door 6 with a plurality of bolts (not illustrated). Referring to FIG. 17, in this embodiment, the hinge hole housing 600 is fixed to the lower surface of the lower frame part of the door 6 with three bolts 607. Accordingly, the fixing member 210 is fixed to the door 6 and does not move.

The fixing member 210 is fixed to the hinge hole housing 600 by two bolts 216. To this end, two fixing holes 211 are provided in the fixing member 210, and two bolt holes 601 to which the bolts 216 are fastened are provided in the upper surface of the hinge hole housing 600.

The fixing member 210 may include two guide protrusions 214 for guiding the movement of the upper moving plate 230. The two guide protrusions 214 are formed parallel to each other in the moving direction of the upper moving plate 230. The two guide protrusions 214 may be formed in a narrow bar shape.

The fixing member 210 includes a hooking portion 212 for supporting the front and rear adjusting bolt 51 to rotate in place without moving in the axial direction of the front and rear adjusting bolt 51. The hooking portion 212 is formed at a substantially right angle to the fixing member 210, and may include a groove 212*a* into which the body 53 of the front and rear adjusting bolt 51 is inserted. The both side surfaces of the groove 212*a* of the hooking portion 212 are formed to be inserted into the hooking groove 57 of the front and rear adjusting bolt 51.

The lower moving plate 220 is disposed on the lower surface of the hinge hole housing 600 and includes a hinge hole 224 into which a hinge shaft 202 is inserted. The hinge hole 224 is formed in a size corresponding to the hinge shaft 202 of the hinge 201 fixed to the cabinet 3. Accordingly, the lower moving plate 220 does not move relative to the hinge shaft 202.

The lower moving plate 220 is disposed to be movable with respect to the hinge hole housing 600 fixed to the lower frame part of the door 6. Accordingly, the lower moving plate 220 may move with respect to the fixing member 210 fixed to the hinge hole housing 600. The lower moving plate 220 is formed to be movable with respect to the hinge hole housing 600 integrally with the upper moving plate 230.

The lower moving plate 220 includes a plurality of coupling holes 221 for coupling with the upper moving plate 230. In this embodiment, the lower moving plate 220 is provided with three coupling holes 221.

The lower moving plate 220 may include a first locking hole 226 for fixing the lower moving plate 220 to the hinge hole housing 600.

In addition, the lower moving plate 220 includes a fixing part 222 to which the front and rear adjusting bolt 51 is fastened. The fixing part 222 extends substantially perpendicular to the lower moving plate 220, and is provided with an adjusting bolt hole 223 to which the front and rear adjusting bolt 51 is fastened. The lower moving plate 220 is disposed so that the fixing part 222 faces the hooking portion 212 of the fixing member 210.

The front and rear adjusting bolt 51 may include a head 52, a body 53, and an intermediate ring 54. The front and rear adjusting bolt 51 is the same as the front and rear adjusting bolt 51 used in the hinge 10 according to the above-described embodiment. Therefore, a detailed description thereof is omitted.

The upper moving plate 230 is disposed on the upper surface of the hinge hole housing 600. The upper moving plate 230 is disposed to be movable with respect to the upper surface of the hinge hole housing 600. The upper moving plate 230 is formed to be movable with respect to the hinge hole housing 600 integrally with the lower moving plate 220. Accordingly, the hinge hole housing 600 is positioned between the upper moving plate 230 and the lower moving plate 220.

The upper moving plate 230 includes a plurality of female screw holes 231 to which a plurality of bolts 227 are fastened for coupling with the lower moving plate 220. The plurality of female screw holes 231 are provided to correspond to the plurality of coupling holes 221 of the lower moving plate 220. In this embodiment, because the lower moving plate 220 is provided with three coupling holes 221, the upper moving plate 230 is provided with three female screw holes 231.

Accordingly, when the plurality of bolts 227 are passed through the plurality of coupling holes 221 of the lower moving plate 220 and the plurality of guide holes 602 of the hinge hole housing 600, and fastened to the plurality of female screw holes 231 of the upper moving plate 230, the lower moving plate 220 and the upper moving plate are integrally coupled.

In addition, the upper moving plate 230 is provided with two guide grooves 234 corresponding to the two guide protrusions 214 of the fixing member 210. Accordingly, when the upper moving plate 230 is disposed at the bottom of a receiving groove 605 of the hinge hole housing 600, the two guide protrusions 214 of the fixing member 210 are inserted into the two guide grooves 234 of the upper moving plate 230, so that the movement of the upper moving plate 230 may be guided by the two guide grooves 234.

Also, the upper moving plate 230 may include a second locking hole 236 for fixing the upper moving plate 230 to the hinge hole housing 600. A locking shaft 240 is inserted into the first locking hole 226 of the lower moving plate 220 and the second locking hole 236 of the upper moving plate 230.

The hinge hole housing 600 is provided with a plurality of guide holes 602 for guiding the forward and backward movement of the upper moving plate 230 and the lower moving plate 220. The plurality of guide holes 602 may be formed as elongated holes penetrating the hinge hole housing 600. The elongated holes forming the plurality of guide holes 602 are elongated in a direction perpendicular to the front surface of the hinge hole housing 600, that is, the door 6.

The receiving groove 605 in which the fixing member 210 and the upper moving plate 230 are received may be provided in the upper surface of the hinge hole housing 600. The receiving groove 605 of the hinge hole housing 600 forms a space in which the upper moving plate 230 may move. The plurality of guide holes 602 through which the plurality of bolts 227 pass are provided at the bottom of the receiving groove 605.

In addition, a hooking portion opening 603 into which the hooking portion 212 of the fixing member 210 is inserted is provided at the bottom of the receiving groove 605. Accordingly, when the fixing member 210 is disposed on the bottom of the receiving groove 605, the hooking portion 212 of the fixing member 210 protrudes from the lower surface of the hinge hole housing 600.

In addition, a third locking hole 606 through the locking shaft 240 passes is provided on the upper surface of the hinge hole housing 600, that is, at the bottom of the receiving groove 605. The third locking hole 606 is formed as an elongated hole in the direction in which the upper moving plate 230 moves.

In addition, the hinge hole housing 600 is provided with a door hinge groove 604 into which the hinge shaft 202 is inserted. The door hinge groove 604 is formed as an elongated groove, so that the hinge shaft 202 may move within the door hinge groove 604 in the direction in which the upper moving plate 230 moves, that is, back and forth with respect to the front surface of the door 6. When the hinge shaft 202 is fixed to the cabinet 3 as in this embodiment, the hinge hole housing 600 in which the door hinge groove 604 is formed, that is, the door 6 may move back and forth with respect to the hinge shaft 202.

The hinge hole adjuster 250 is formed to move the lower moving plate 220 in the front-rear direction with respect to the front surface of the door 6. In this embodiment, the hinge hole adjuster 250 may include the hooking portion 212 extending vertically from the fixing member 210 and the front and rear adjusting bolt 51 that rotates with respect to the hooking portion 212 and moves the lower moving plate 220 back and forth with respect to the front surface of the door 6.

Therefore, when the front and rear adjusting bolt 51 is turned in a state in which the hooking portion 212 of the fixing member 210 is hooked on the hooking groove 57 of the front and rear adjusting bolt 51, the lower moving plate 220 is moved back and forth with respect to the hinge hole housing 600, that is, the door 6 by the front and rear adjusting bolt 51 coupled to the fixing part 222 of the lower moving plate 220.

A locking lever 243 for fixing the lower moving plate 220 to the hinge hole housing 600 may be disposed under the lower moving plate 220. The locking lever 243 is pin-coupled to the locking shaft 240. Accordingly, the locking lever 243 includes a locking groove 244 into which the locking shaft 240 is inserted. A pair of locking protrusions 245 are provided on both sides of the locking groove 244. When the locking protrusions 245 presses the lower moving plate 220 against the lower surface of the hinge hole housing 600, the lower moving plate 220 is fixed and does not move with respect to the hinge hole housing 600. A pin hole 246 into which a pin 247 is inserted is provided in each of the pair of locking protrusions 245.

The locking shaft 240 includes a head 241 having a larger diameter than the diameter of the locking shaft 240 provided at one end of the locking shaft 240 and a pin hole 242 into which the pin 247 is inserted provided at the other end thereof. Accordingly, after the locking shaft 240 is sequentially inserted into the second locking hole 236 of the upper moving plate 230, the third locking hole 606 of the hinge hole housing 600, and the first locking hole 226 of the lower moving plate 220, when the other end of the locking shaft 240 protruding downward from the lower moving plate 220 is inserted into the locking groove 244 of the locking lever 243, and the pin 247 is inserted into the pin holes 246 of the locking lever 243 and the pin hole 242 of the locking shaft 240, the locking lever 243 may be rotated with respect to the lower moving plate 220.

When the pair of the locking protrusions 245 of the locking lever 243 press the lower moving plate 220, the lower moving plate 220 is fixed to the hinge hole housing 600 and does not move relative to the hinge hole housing 600. At this time, because the lower moving plate 220 is integrally coupled with the upper moving plate 230, the upper moving plate 230 does not move with respect to the hinge hole housing 600. In other words, in this embodiment, the locking lever 243 is used as a locking member for fixing the lower moving plate 220 to the hinge hole housing 600, that is, the door 6.

When the locking protrusions 245 of the locking lever 243 do not fix the lower moving plate 220 to the hinge hole housing 600, the lower moving plate 220 may move with respect to the hinge hole housing 600.

Because the front and rear adjusting bolt 51 is hooked on the hooking portion 212 of the fixing member 210, when the front and rear adjusting bolt 51 is rotated in one direction in this state, the lower moving plate 220 may be moved with respect to the fixing member 210, that is, the hinge hole housing 600.

However, because the lower moving plate 220 is fixed to the hinge shaft 202 of the hinge 201 disposed in the cabinet 3, the lower moving plate 220 does not move and the fixing member 210, that is, the hinge hole housing 600 is moved with respect to the lower moving plate 220. Because the hinge hole housing 600 is fixed to the door 6, when the front and rear adjusting bolt 51 is rotated in one direction, the door 6 is moved with respect to the cabinet 3, so that the gap G between the rear surface of the door 6 and the front surface of the cabinet 3 may be adjusted.

When the front and rear adjusting bolt 51 is rotated in one direction, the gap G between the rear surface of the door 6 and the front surface of the cabinet 3 is widened. When the front and rear adjusting bolt 51 is rotated in the opposite direction, the gap G between the rear surface of the door 6 and the front surface of the cabinet 3 is narrowed. Accordingly, the level difference between the upper left door 5 and the upper right door 6 may be removed by rotating the front and rear adjusting bolt 51.

Hereinafter, a hinge hole assembly according to an embodiment disposed on a door will be described in detail with reference to FIGS. 18 to 21.

Figure 18:
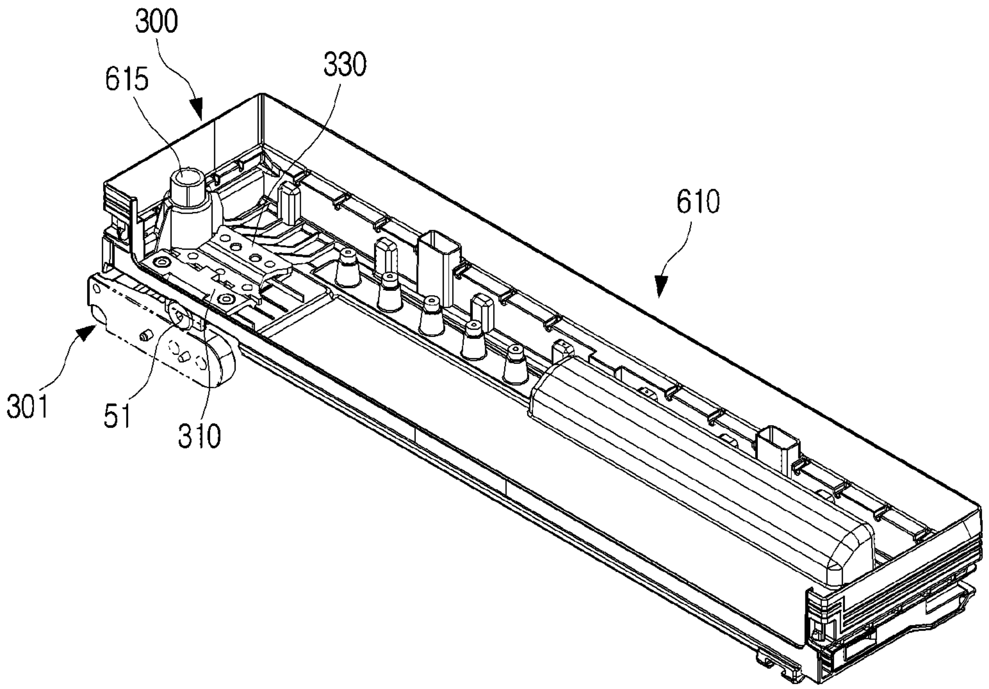
FIG. 18 is a perspective view illustrating a hinge hole assembly according to an embodiment.
Figure 19:
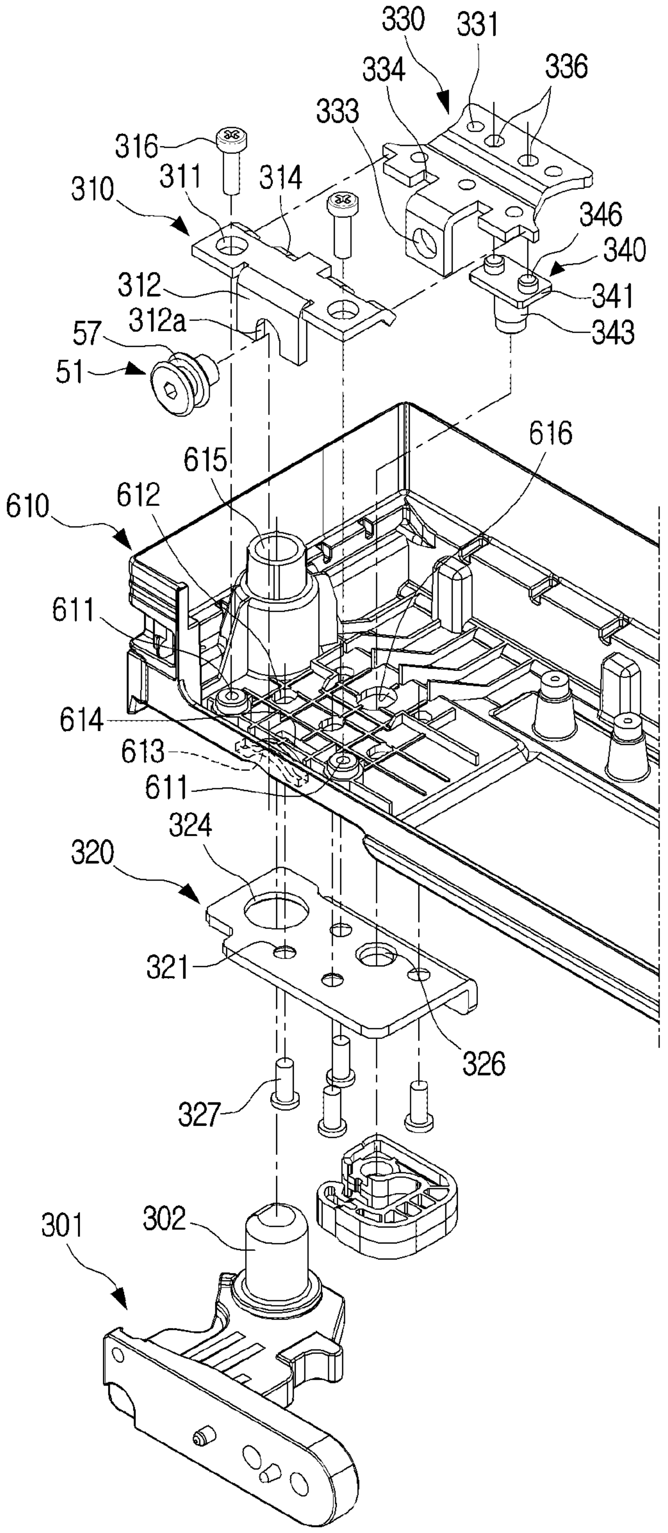
FIG. 19 is an exploded perspective view illustrating the hinge hole assembly of FIG. 18.
Figure 20:
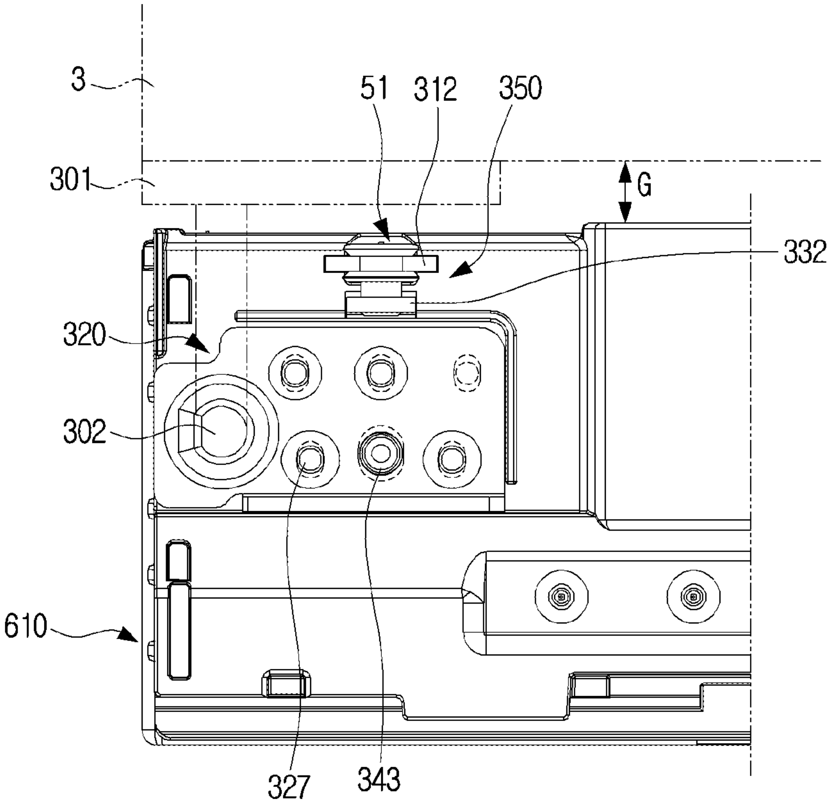
FIG. 20 is a bottom view illustrating the hinge hole assembly of FIG. 18.
Figure 21:
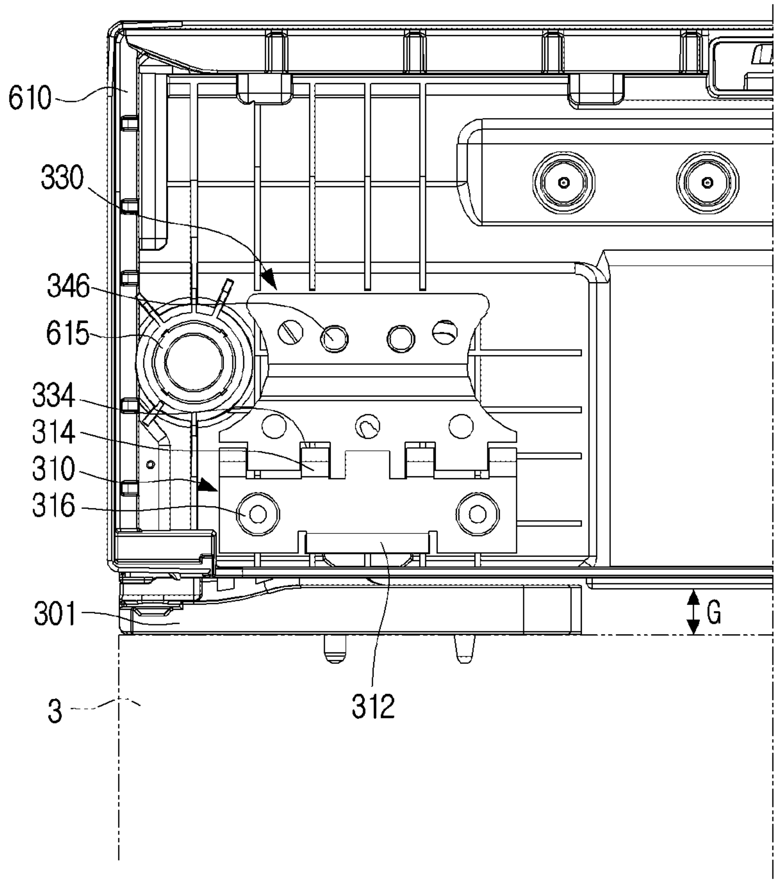
FIG. 21 is a plan view illustrating the hinge hole assembly of FIG. 18.

FIG. 18 is a perspective view illustrating a hinge hole assembly according to an embodiment. FIG. 19 is an exploded perspective view illustrating the hinge hole assembly of FIG. 18. FIG. 20 is a bottom view illustrating the hinge hole assembly of FIG. 18. FIG. 21 is a plan view illustrating the hinge hole assembly of FIG. 18.

Referring to FIGS. 18 to 21, a hinge hole assembly 300 according to an embodiment may include a fixing member 310, an upper moving plate 330, a lower moving plate 320, and a hinge hole adjuster 350.

The fixing member 310 is fixed to a lower frame part 610. The lower frame part 610 forms a door (not illustrated) together with a left frame part, a right frame part, and an upper frame part. Accordingly, the fixing member 310 is fixed to the lower frame part 610, that is, the door and does not move.

The fixing member 310 is fixed to the upper surface of the lower frame part 610 by two bolts 316. To this end, two fixing holes 311 are provided in the fixing member 310, and two bolt holes 611 to which the bolts 316 are fastened are provided in the upper surface of the lower frame part 610. The two bolt holes 611 are formed in two protrusions protruding from the upper surface of the lower frame part

610. Accordingly, a predetermined gap is formed between the fixing member 310 and the upper surface of the lower frame part 610.

The fixing member 310 may include two guide protrusions 314 for guiding the movement of the upper moving plate 330. The two guide protrusions 314 are formed parallel to each other in the moving direction of the upper moving plate 330. The two guide protrusions 314 may be formed to be inclined downward in a narrow bar shape.

The fixing member 310 includes a hooking portion 312 that supports the front and rear adjusting bolt 51 to rotate in place without moving in the axial direction of the front and rear adjusting bolt 51. The hooking portion 312 is formed at a substantially right angle to the fixing member 310, and may include a groove 312*a* into which the body 53 of the front and rear adjusting bolt 51 is inserted. The both side surfaces of the groove 312*a* of the hooking portion 312 are formed to be inserted into the hooking groove 57 of the front and rear adjusting bolt 51. When the fixing member 310 is disposed on the upper surface of the lower frame part 610, the hooking portion 312 protrudes below the lower frame part 610.

The upper moving plate 330 is disposed on the upper surface of the lower frame part 610. The upper moving plate 330 is disposed to be movable with respect to the upper surface of the lower frame part 610. The upper moving plate 330 is formed to be movable with respect to the lower frame part 610 integrally with the lower moving plate 320. Accordingly, the lower frame part 610 is positioned between the upper moving plate 330 and the lower moving plate 320.

The upper moving plate 330 includes a plurality of female screw holes 331 to which a plurality of bolts 327 are fastened for coupling with the lower moving plate 320. The plurality of female screw holes 331 are provided to correspond to the plurality of coupling holes 321 of the lower moving plate 320.

In addition, the upper moving plate 330 includes a fixing part 332 to which the front and rear adjusting bolt 51 is fastened. The fixing part 332 extends approximately at a right angle to the upper moving plate 330, and is provided with an adjusting bolt hole 333 to which the front and rear adjusting bolt 51 is fastened. The fixing part 332 of the upper moving plate 330 is positioned below the fixing member 310 and is disposed to face the hooking portion 312 of the fixing member 310. In other words, the fixing part 332 of the upper moving plate 330 is located in the gap between the fixing member 310 and the lower frame part 610. The fixing part 332 protrudes below the lower frame part 610 to face the hooking portion 312 of the fixing member 310.

In addition, the upper moving plate 330 is provided with two guide grooves 334 corresponding to the two guide protrusions 314 of the fixing member 310. Accordingly, when the upper moving plate 330 is disposed on the upper surface of the lower frame part 610, the two guide protrusions 314 of the fixing member 310 are inserted into the two guide grooves 334 of the upper moving plate 330, so that the movement of the upper moving plate 330 may be guided by the two guide grooves 334.

In addition, a support member 340 for supporting the movement of the upper moving plate 330 may be provided under the upper moving plate 330. The support member 340 may include a support plate 341, a guide post 343 extending vertically from the lower surface of the support plate 341, and two coupling protrusions 346 formed on the upper surface of the support plate 341.

The two coupling protrusions 346 are inserted into two coupling holes 336 provided in the upper moving plate 330. Then, the support member 340 may be integrated with the upper moving plate 330 to slide with respect to the upper surface of the lower frame part 610. The guide post 343 of the support member 340 is inserted into a support member guide hole 616 of the lower frame part 610.

The front and rear adjusting bolt 51 may include a head 52, a body 53, and an intermediate ring 54. The front and rear adjusting bolt 51 is disposed between the hooking portion 312 of the fixing member 310 and the fixing part 332 of the upper moving plate 330, and causes the upper moving plate 330 to move with respect to the fixing member 310. The front and rear adjusting bolt 51 is the same as the front and rear adjusting bolt 51 used in the hinge 10 according to the above-described embodiment. Therefore, a detailed description thereof is omitted.

The lower moving plate 320 is disposed on the lower surface of the lower frame part 610 of the door, and includes a hinge hole 324 into which a hinge shaft 302 is inserted. The hinge hole 324 is formed in a size corresponding to the hinge shaft 302 of the hinge 301 fixed to the cabinet 3. Accordingly, the lower moving plate 320 does not move relative to the hinge shaft 302.

The lower moving plate 320 is disposed to be movable with respect to the lower frame part 610 of the door. Accordingly, the lower moving plate 320 is formed to be movable with respect to the lower frame part 610 integrally with the upper moving plate 330.

The lower moving plate 320 includes a plurality of coupling holes 321 for coupling with the upper moving plate 330. Accordingly, when the plurality of bolts 327 are passed through the plurality of coupling holes 321 of the lower moving plate 320 and the plurality of guide holes 612 of the lower frame part 610, and fastened to the plurality of female screw holes 331 of the upper moving plate 330, the lower moving plate 320 and the upper moving plate 330 are integrally coupled.

In addition, the lower moving plate 320 may include one pillar hole 326. The guide post 343 of the support member 340 is inserted into and coupled to the pillar hole 326. Accordingly, the two coupling protrusions 346 of the support member 340 are coupled to the two coupling holes 336 of the upper moving plate 330 and the guide post 343 of the support member 340 is coupled to the pillar hole 326 of the lower moving plate 320, so that the lower moving plate 320 may move integrally with the upper moving plate 330 by the support member 340.

The lower frame part 610 is provided with a plurality of guide holes 612 and one support member guide hole 616 for guiding the forward and backward movements of the upper moving plate 330 and the lower moving plate 320.

The plurality of guide holes 612 may be formed as elongated holes penetrating the lower frame part 610. The elongated holes forming the plurality of guide holes 612 are elongated in the direction perpendicular to the lower frame part 610, that is, the front surface of the door.

The support member guide hole 616 may be formed as an elongated hole penetrating the lower frame part 610 to guide the guide post 343 of the support member 340. The elongated hole forming the support member guide hole 616 is elongated in the direction perpendicular to the lower frame part 610, that is, the front surface of the door. Accordingly, the guide post 343 of the support member 340 may slide with respect to the support member guide hole 616.

In addition, the lower frame part 610 is provided with a hooking portion opening 613 into which the hooking portion 312 of the fixing member 310 is inserted. Therefore, when the fixing member 310 is disposed on the upper surface of the lower frame part 610, the hooking portion 312 of the fixing member 310 protrudes from the lower surface of the lower frame part 610 through the hooking portion opening 613.

The lower frame part 610 is provided with a fixing part opening 614 into which the fixing part 332 of the upper moving plate 330 is inserted at one side of the hooking portion opening 613. The fixing part opening 614 is formed so that the fixing part 332 of the upper moving plate 330 may move back and forth therein. Accordingly, when the upper moving plate 330 is disposed on the upper surface of the lower frame part 610, the fixing part 332 of the upper moving plate 330 protrudes from the lower surface of the lower frame part 610 through the fixing part opening 614 and faces the hooking portion 312 of the fixing member 310.

In addition, the lower frame part 610 is provided with a door hinge groove 615 into which the hinge shaft 302 is inserted. The door hinge groove 615 is formed as an elongated groove, so that the hinge shaft 302 may move within the door hinge groove 615 in the moving direction of the upper moving plate 330, that is, back and forth with respect to the front surface of the door. When the hinge shaft 302 of the hinge 301 is fixed to the front surface of the cabinet 3 as in this embodiment, the lower frame part 610 in which the door hinge groove 615 is formed, that is, the door may be moved back and forth with respect to the hinge shaft 302.

The hinge hole adjuster 350 is formed to move the upper moving plate 330 in the front-rear direction with respect to the front surface of the door. In this embodiment, the hinge hole adjuster 350 may include the hooking portion 312 extending vertically from the fixing member 310 and the front and rear adjusting bolt 51 that rotates with respect to the hooking portion 312 and moves the upper moving plate 330 back and forth with respect to the front surface of the door.

Therefore, when the front and rear adjusting bolt 51 is turned in a state in which the hooking portion 312 of the fixing member 310 is hooked on the hooking groove 57 of the front and rear adjusting bolt 51, the upper moving plate 330 is moved back and forth with respect to the lower frame part 610, that is, the door by the front and rear adjusting bolt 51 coupled to the fixing part 332 of the upper moving plate 330.

When the plurality of bolts 327 connecting the lower moving plate 320 and the upper moving plate 330 are loosened, the upper moving plate 330 may be moved with respect to the lower frame part 610 by the front and rear adjusting bolt 51. When the plurality of bolts 327 connecting the lower moving plate 320 and the upper moving plate 330 are tightened, the upper moving plate 330 may not be moved with respect to the lower frame part 610 by the front and rear adjusting bolt 51.

In detail, when the front and rear adjusting bolt 51 is rotated in one direction in a state in which the plurality of bolts 327 coupling the lower moving plate 320 and the upper moving plate 330 are loosened, because the front and rear adjusting bolt 51 is caught by the hooking portion 312 of the fixing member 310, the upper moving plate 330 may be moved with respect to the fixing member 310, that is, the lower frame part 610.

However, the upper moving plate 330 is connected to the lower moving plate 320 by the plurality of bolts 327 and the support member 340, and the lower moving plate 320 is fixed to the hinge shaft 302 of the hinge 301 disposed in the cabinet 3, so that the upper moving plate 330 does not move and the fixing member 310, that is, the lower frame part 610 moves with respect to the upper moving plate 330. Because the lower frame part 610 is fixed to the door, when the front and rear adjusting bolt 51 is rotated in one direction, the door is moved with respect to the cabinet 3, so that the gap G between the rear surface of the door and the front surface of the cabinet 3 may be adjusted.

When the front and rear adjusting bolt 51 is rotated in one direction, the gap G between the rear surface of the door, that is, the rear surface of the lower frame part 610 and the front surface of the cabinet 3 is widened. When the front and rear adjusting bolt 51 is rotated in the opposite direction, the gap G between the rear surface of the door and the front surface of the cabinet 3 is narrowed. Accordingly, the level difference between the upper left door and the upper right door may be removed by rotating the front and rear adjusting bolt 51.

Hereinafter, a hinge hole assembly according to an embodiment disposed on a door will be described in detail with reference to FIGS. 22 to 25.

Figure 22:
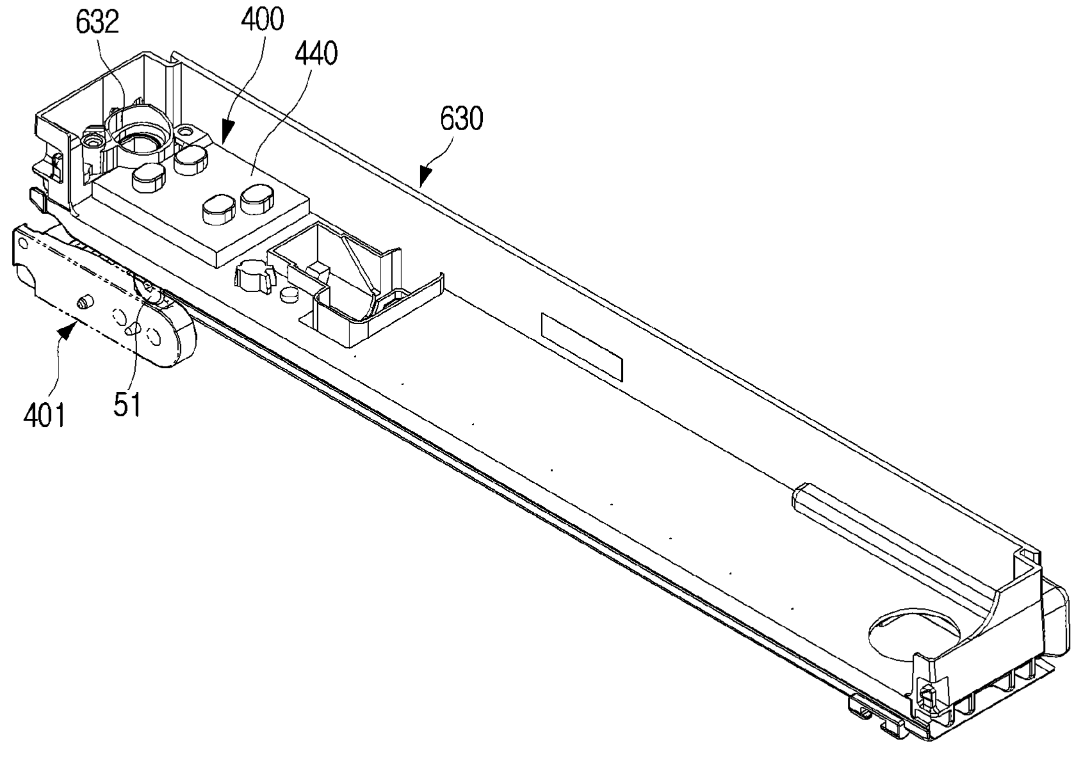
FIG. 22 is a perspective view illustrating a hinge hole assembly according to an embodiment.
Figure 23:
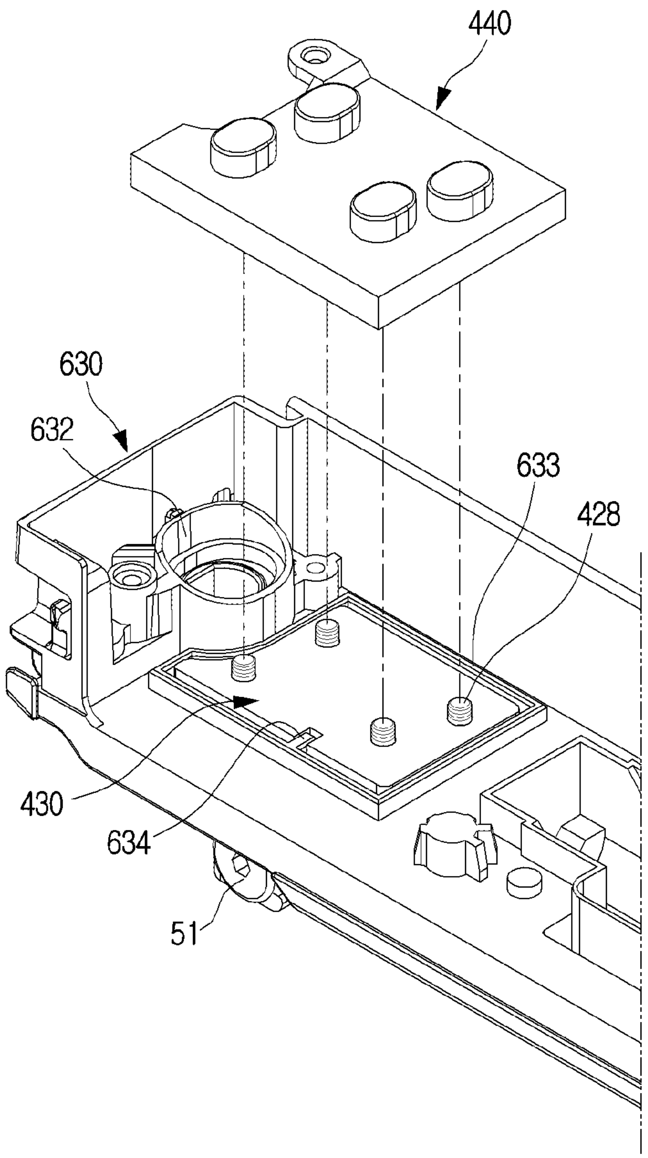
FIG. 23 is a perspective view illustrating a state in which a hinge cover and a hinge shaft are disassembled in the hinge hole assembly of FIG. 22.
Figure 24:
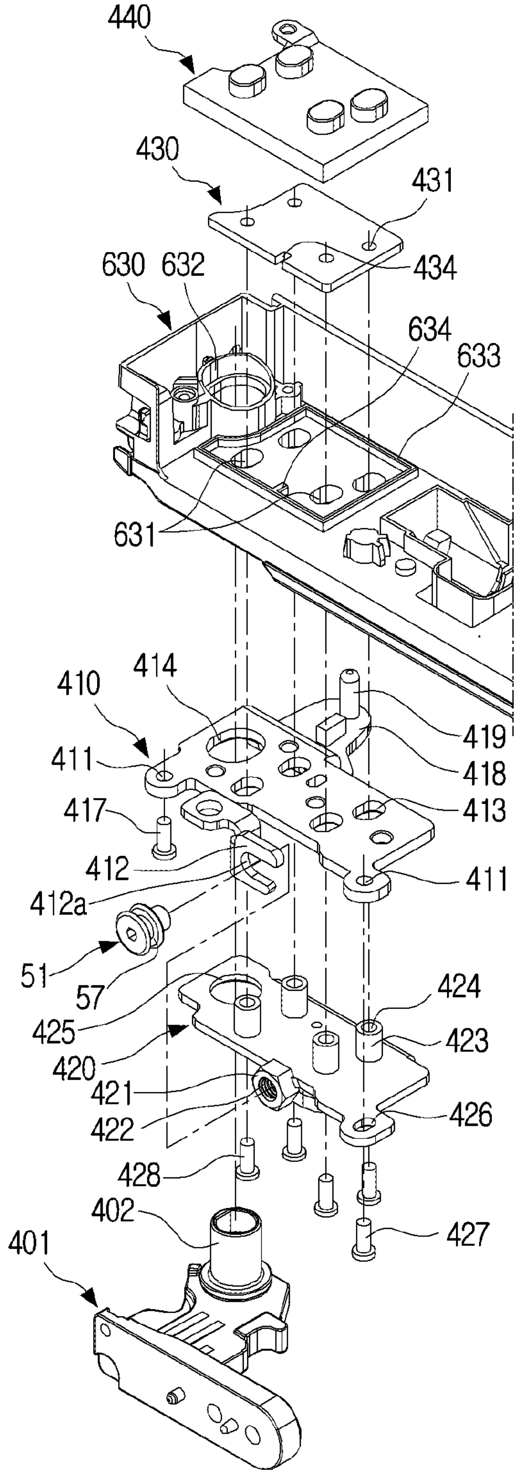
FIG. 24 is an exploded perspective view illustrating the hinge hole assembly of FIG. 22.
Figure 25:
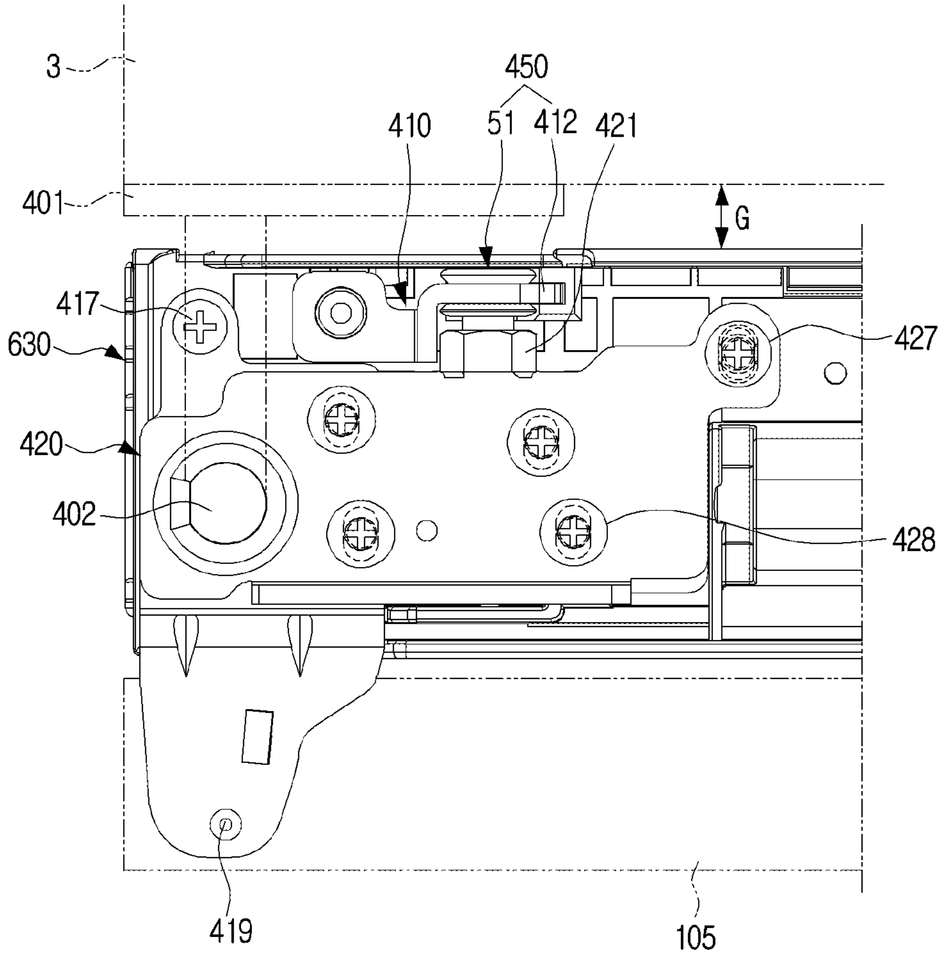
FIG. 25 is a bottom view illustrating the hinge hole assembly of FIG. 22.

FIG. 22 is a perspective view illustrating a hinge hole assembly according to an embodiment. FIG. 23 is a perspective view illustrating a state in which a hinge cover and a hinge shaft are disassembled in the hinge hole assembly of FIG. 22. FIG. 24 is an exploded perspective view illustrating the hinge hole assembly of FIG. 22, and FIG. 25 is a bottom view illustrating the hinge hole assembly of FIG. 22.

Referring to FIGS. 22 to 25, a hinge hole assembly 400 according to an embodiment may include a fixing member 410, an upper moving plate 430, a lower moving plate 420, and a hinge hole adjuster 450.

The fixing member 410 is fixed to a lower frame part 630. The lower frame part 630 forms a door together with a left frame part, a right frame part, and an upper frame part. Accordingly, the fixing member 410 is fixed to the lower frame part 630, that is, the door and does not move.

The fixing member 410 is formed in a flat plate shape and is fixed to the lower surface of the lower frame part 630. The fixing member 410 may be fixed to the lower surface of the lower frame part 630 with a plurality of bolts 417 and 427. For example, in this embodiment, the fixing member 410 is fixed to the lower surface of the lower frame part 630 with one bolt 417. In addition, the fixing member 410 is fixed to the lower surface of the lower frame part 630 by a locking bolt 427. To this end, the fixing member 410 is provided with two fixing holes 411, and two bolt holes to which the bolt 417 and the locking bolt 427 are fastened are provided on the lower surface of the lower frame part 630.

The fixing member 410 includes a hooking portion 412 that supports the front and rear adjusting bolt 51 to rotate in place without moving in the axial direction of the front and rear adjusting bolt 51. The hooking portion 412 extends substantially vertically from the fixing member 410, and may include a groove 412*a* into which the body 53 of the front and rear adjusting bolt 51 is inserted. The both side surfaces of the groove 412*a* of the hooking portion 412 are formed to be inserted into the hooking groove 57 of the front and rear adjusting bolt 51.

The fixing member 410 includes a plurality of sub guide holes 413 and a sub door hinge hole 414 corresponding to a plurality of guide holes 631 and a door hinge hole 632 of the lower frame part 630. The plurality of sub guide holes 413 and the sub door hinge hole 414 are formed as elongated holes.

A sub hinge shaft 419 may be provided on one side of the fixing member 410, that is, on the opposite side of the hooking portion 412. The sub hinge shaft 419 is formed perpendicular to a sub hinge plate 418 extending from the fixing member 410, and is inserted into a sub hinge hole (not illustrated) provided on the lower surface of a sub-door 105.

In the case of a refrigerator that does not include the sub-door 105, the sub hinge plate 418 and the sub hinge shaft 419 are not disposed on one side of the fixing member 410.

The lower moving plate 420 is provided under the fixing member 410 disposed on the lower surface of the lower frame part 630 and includes a hinge hole 425 into which a hinge shaft 402 is inserted. The hinge hole 425 is formed in a size corresponding to the hinge shaft 402 of the hinge 401 fixed to the cabinet 3. Accordingly, the lower moving plate 420 does not move with respect to the hinge shaft 402.

The lower moving plate 420 is disposed to be movable with respect to the fixing member 410. Accordingly, the lower moving plate 420 may move with respect to the lower frame part 630 in which the fixing member 410 is disposed. The lower moving plate 420 is formed to be movable with respect to the lower frame part 630 integrally with the upper moving plate 430.

The lower moving plate 420 includes a plurality of coupling holes for coupling with the upper moving plate 430. In this embodiment, the lower moving plate 420 is provided with four coupling holes.

The lower moving plate 420 includes a plurality of sleeves 423 provided perpendicular to the lower moving plate 420 for coupling with the upper moving plate 430. The plurality of sleeves 423 are provided to correspond to the plurality of coupling holes of the lower moving plate 420.

In this embodiment, because four coupling holes are formed in the lower moving plate 420, four sleeves 423 are provided in the lower moving plate 420. Through holes 424 corresponding to the coupling holes of the lower moving plate 420 are formed in the sleeves 423, so that bolts 428 pass through the sleeves 423. In this embodiment, the plurality of sleeves 423 are integrally formed with the lower moving plate 420. However, as another example, the plurality of sleeves 423 may be formed separately from the lower moving plate 420.

In addition, the lower moving plate 420 may include a locking hole 426 for fixing the lower moving plate 420 to the lower frame part 630. The locking hole 426 is formed as an elongated hole in the moving direction of the lower moving plate 420.

A locking screw hole to which a locking bolt 427 for fixing the lower moving plate 420 is fastened is provided on the lower surface of the lower frame part 630. The locking bolt 427 passes through the bolt hole 411 of the fixing member 410 and is fastened to the locking screw hole of the lower frame part 630. Accordingly, when the locking bolt 427 is inserted into the locking hole 426 of the lower moving plate 420 to penetrate the bolt hole 411 of the fixing member 410 and fastened to the locking screw hole of the lower frame part 630, the lower moving plate 420 is fixed to the lower frame part 630. In other words, in this embodiment, the locking bolt 427 is used as a locking member for fixing the lower moving plate 420 to the door.

In addition, the lower moving plate 420 includes a fixing part 421 to which the front and rear adjusting bolt 51 is fastened. The fixing part 421 extends substantially perpendicular to the lower moving plate 420, and is provided with an adjusting bolt hole 422 to which the front and rear adjusting bolt 51 is fastened. The fixing part 421 of the lower moving plate 420 is disposed to face the hooking portion 412 of the fixing member 410. The fixing part 421 of the lower moving plate 420 may be formed by fixing a nut having a standard corresponding to the threaded portion 55 of the front and rear adjusting bolt 51 to the lower moving plate 420.

The front and rear adjusting bolt 51 may include a head 52, a body 53, and an intermediate ring 54. The front and rear adjusting bolt 51 is disposed between the hooking portion 412 of the fixing member 410 and the fixing part 421 of the lower moving plate 420. The front and rear adjusting bolt 51 is the same as the front and rear adjusting bolt 51 used in the hinge 10 according to the above-described embodiment. Therefore, a detailed description thereof is omitted.

The upper moving plate 430 is disposed on the upper surface of the lower frame part 630. The upper moving plate 430 is disposed to be movable with respect to the upper surface of the lower frame part 630. The upper moving plate 430 is formed to be movable with respect to the lower frame part 630 integrally with the lower moving plate 420. Accordingly, the lower frame part 630 is positioned between the upper moving plate 430 and the lower moving plate 420.

The upper moving plate 330 includes a plurality of screw holes 431 which correspond to the plurality of sleeves 423 of the lower moving plate 420 and to which a plurality of bolts 428 are fastened. In this embodiment, because the lower moving plate 420 is provided with four sleeves 423, the upper moving plate 430 is provided with four screw holes 431. The plurality of sleeves 423 allow the upper moving plate 430 and the lower moving plate 420 to maintain a predetermined distance.

Accordingly, when the plurality of bolts 428 are passed through the plurality of coupling holes and the plurality of sleeves 423 of the lower moving plate 420 and are fastened to the plurality of screw holes 431 of the upper moving plate 430, the upper moving plate 430 is integrally coupled to the lower moving plate 420.

The lower frame part 630 is provided with a plurality of guide holes 631 for guiding the forward and backward movements of the upper moving plate 430 and the lower moving plate 420. The plurality of guide holes 631 may be formed as elongated holes penetrating the lower frame part 630. The elongated holes forming the plurality of guide holes 631 are elongated in the direction perpendicular to the lower frame part 630, that is, the front surface of the door.

The plurality of sleeves 423 of the lower moving plate 420 are inserted into the plurality of guide holes 631 of the lower frame part 630. Each of the plurality of sleeves 423 may slide along both inner surfaces of each of the plurality of the guide holes 631. Accordingly, the lower moving plate 420 may move a predetermined distance in the front-rear direction of the door along the plurality of guide holes 631.

A dam 633 formed to surround the plurality of guide holes 631 may be provided on the upper surface of the lower frame part 630. The dam 633 forms a space in which the upper moving plate 430 may move on the upper surface of the lower frame part 630. A guide projection 634 may be provided on the inner surface of the dam 633. The guide projection 634 is formed to guide the movement of the upper moving plate 430 back and forth with respect to the upper surface of the lower frame part 630. Accordingly, the upper moving plate 430 may be provided with a guide groove 434 corresponding to the guide projection 634.

In addition, the lower frame part 630 is provided with a door hinge hole 632 into which the hinge shaft 402 is inserted. The door hinge hole 632 is formed as an elongated hole, so that the hinge shaft 402 may move back and forth within the door hinge hole 632. When the hinge shaft 402 is fixed to the cabinet 3 as in this embodiment, the lower frame part 630 in which the door hinge hole 632 is formed, that is, the door may move back and forth with respect to the hinge shaft 402.

In addition, a hinge cover 440 may be disposed above the upper moving plate 430. The hinge cover 440 is coupled to the dam 633 provided on the upper surface of the lower frame part 630 to form the space in which the upper moving plate 430 may move. Therefore, when the urethane is filled in the inner space of the door, the urethane does not penetrate between the hinge cover 440 and the upper surface of the lower frame part 630.

The hinge hole adjuster 450 is formed to move the lower moving plate 420 in the front-rear direction with respect to the front surface of the door. In this embodiment, the hinge hole adjuster 450 may include the hooking portion 412 extending vertically from the fixing member 410 and the front and rear adjusting bolt 51 that rotates with respect to the hooking portion 412 and moves the lower moving plate 420 back and forth with respect to the front surface of the door.

Therefore, when the front and rear adjusting bolt 51 is turned in a state in which the hooking portion 412 of the fixing member 410 is hooked on the hooking groove 57 of the front and rear adjusting bolt 51, the lower moving plate 420 is moved back and forth with respect to the lower frame part 630, that is, the door by the front and rear adjusting bolt 51 coupled to the fixing part 421 of the lower moving plate 420.

In this embodiment, when the locking bolt 427 does not fix the lower moving plate 420 with respect to the lower frame part 630, the lower moving plate 420 may move with respect to the lower frame part 630.

When the front and rear adjusting bolt 51 is rotated in one direction in this state, because the front and rear adjusting bolt 51 is caught on the hooking portion 412 of the fixing member 410, the lower moving plate 420 may be moved with respect to the fixing member 410, that is, the lower frame part 630.

However, because the lower moving plate 420 is fixed to the hinge shaft 402 of the hinge 401 disposed in the cabinet 3, the lower moving plate 420 does not move and the fixing member 410, that is, the lower frame part 630 moves with respect to the lower moving plate 420. Because the lower frame part 630 is fixed to the door, when the front and rear adjusting bolt 51 is rotated in one direction, the door is moved with respect to the cabinet 3, so that the gap G between the rear surface of the door, that is, the rear surface of the lower frame part 630 and the front surface of the cabinet 3 may be adjusted.

When the front and rear adjusting bolt 51 is rotated in one direction, the gap G between the rear surface of the door and the front surface of the cabinet 3 is widened. When the front and rear adjusting bolt 51 is rotated in the opposite direction, the gap G between the rear surface of the door and the front surface of the cabinet 3 is narrowed. Accordingly, the level difference between the upper left door and the upper right door may be removed by rotating the front and rear adjusting bolt 51.

Hereinafter, a refrigerator according to an embodiment will be described in detail with reference to FIGS. 26 to 31.

Figure 26:
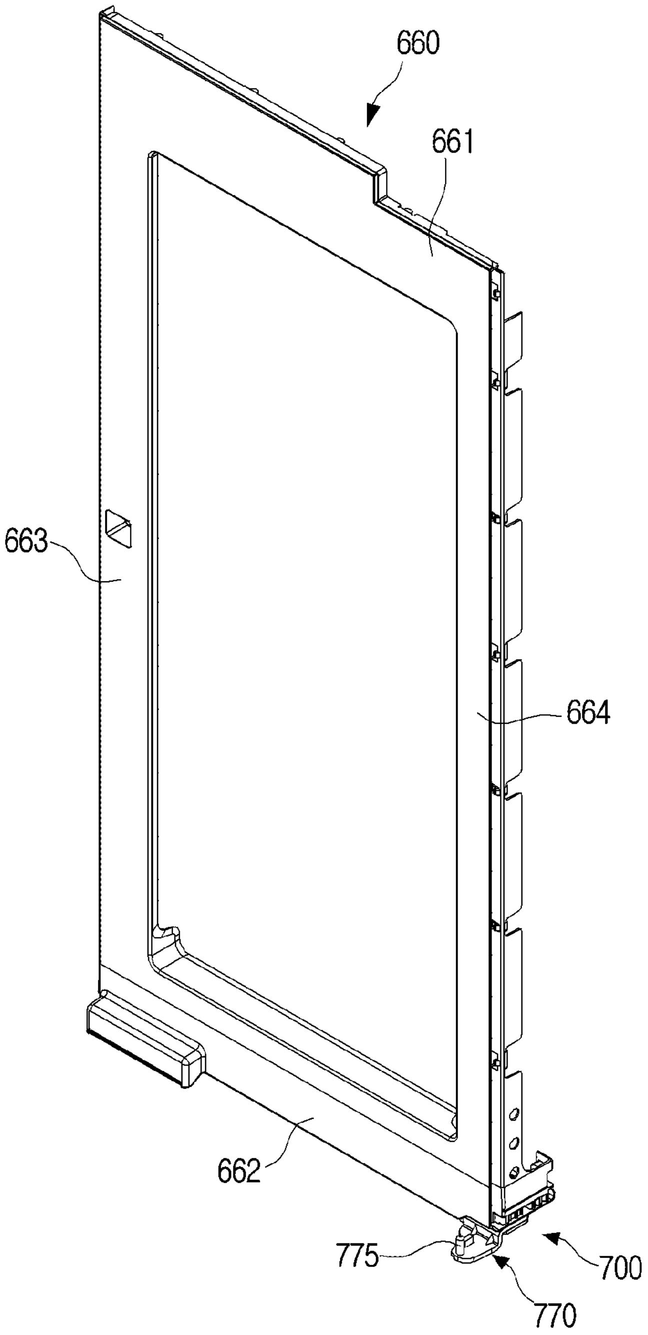
FIG. 26 is a perspective view illustrating a door frame according to an embodiment.

FIG. 26 is a perspective view illustrating a door frame of a refrigerator in which a hinge hole assembly is disposed according to an embodiment.

Referring to FIG. 26, a hinge hole assembly 700 according to an embodiment is disposed on the right side of the lower end of the upper right door 6 (see FIG. 1). The hinge hole assembly 700 may include a hinge hole 721 into which a hinge shaft 702 of a hinge 701 disposed in the cabinet 3 is inserted. The hinge hole assembly 700 is configured to move the hinge hole 721 back and forth with respect to the front surface of the door 6.

FIG. 26 shows a door frame 660 forming the door 6. The door frame 660 is formed in a rectangular shape and includes an upper frame part 661, a lower frame part 662, a left frame part 663, and a right frame part 664. The hinge hole assembly 700 may be disposed on the right side of the lower frame part 662 of the door 6.

In addition, the door frame 660 of the upper right door 6 shown in FIG. 26 further includes a sub hinge 770 capable of rotatably supporting a sub-door (not illustrated) on the front surface thereof.

Hereinafter, the hinge hole assembly 700 according to an embodiment disposed in the door frame 660 will be described in detail with reference to FIGS. 27 to 31.

Figure 27:
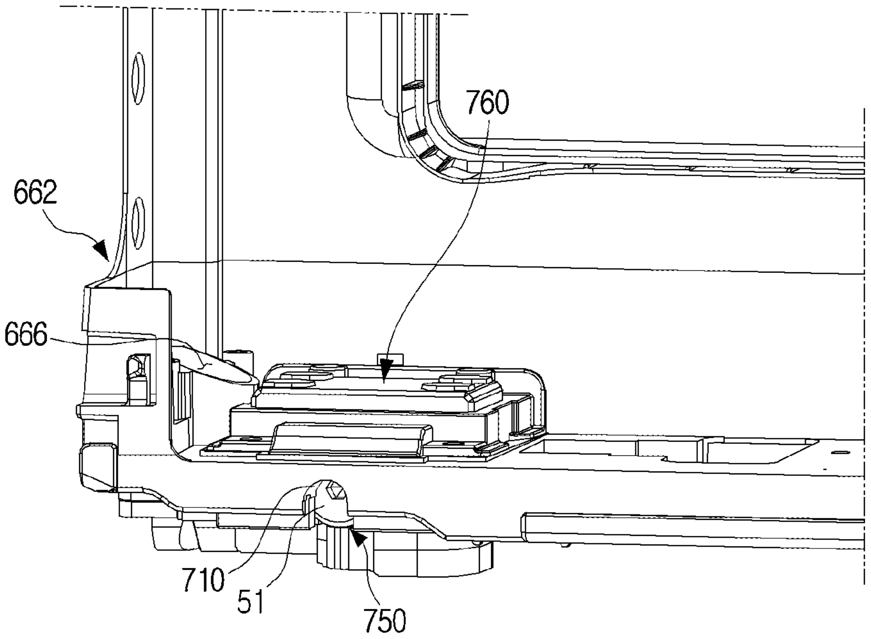
FIG. 27 is a rear perspective view illustrating a hinge hole assembly disposed in the door frame of FIG. 26.
Figure 28:
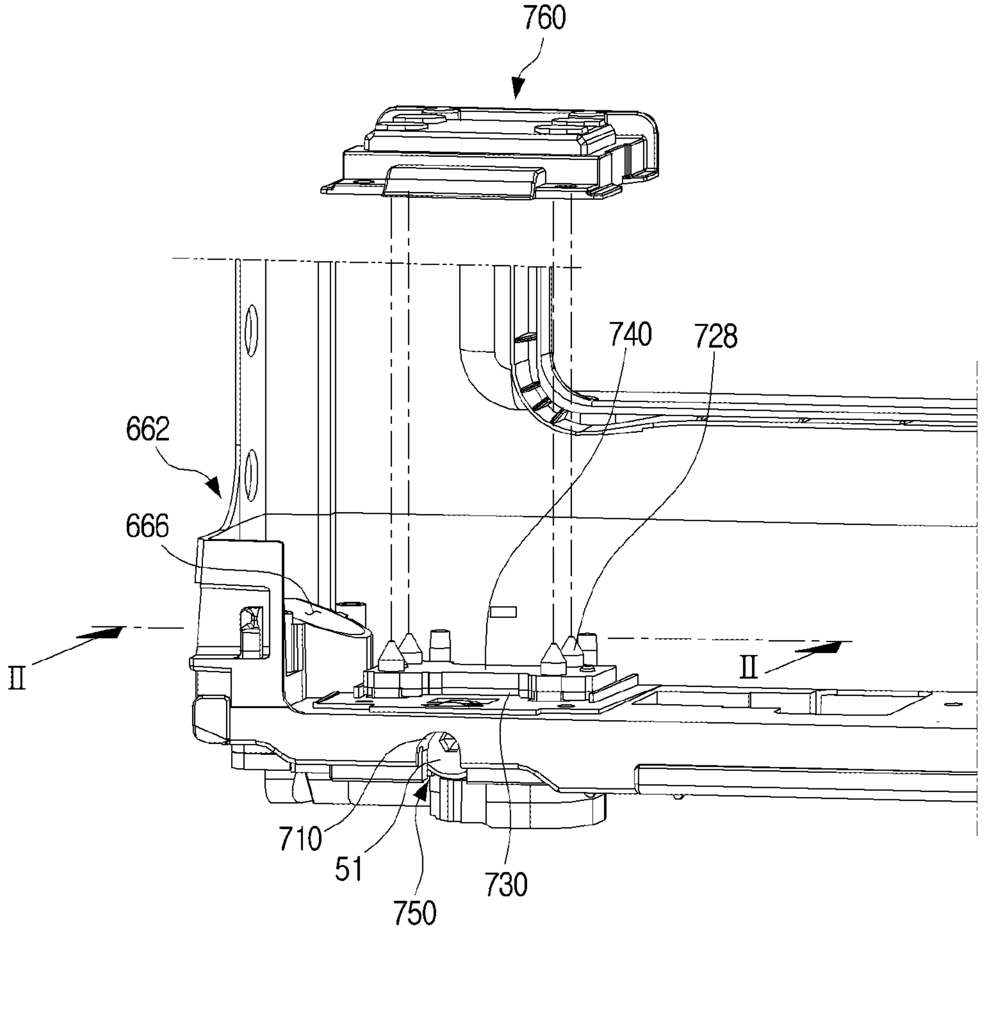
FIG. 28 is a perspective view illustrating a state in which a hinge cover is removed from the hinge hole assembly of FIG. 27.
Figure 29:
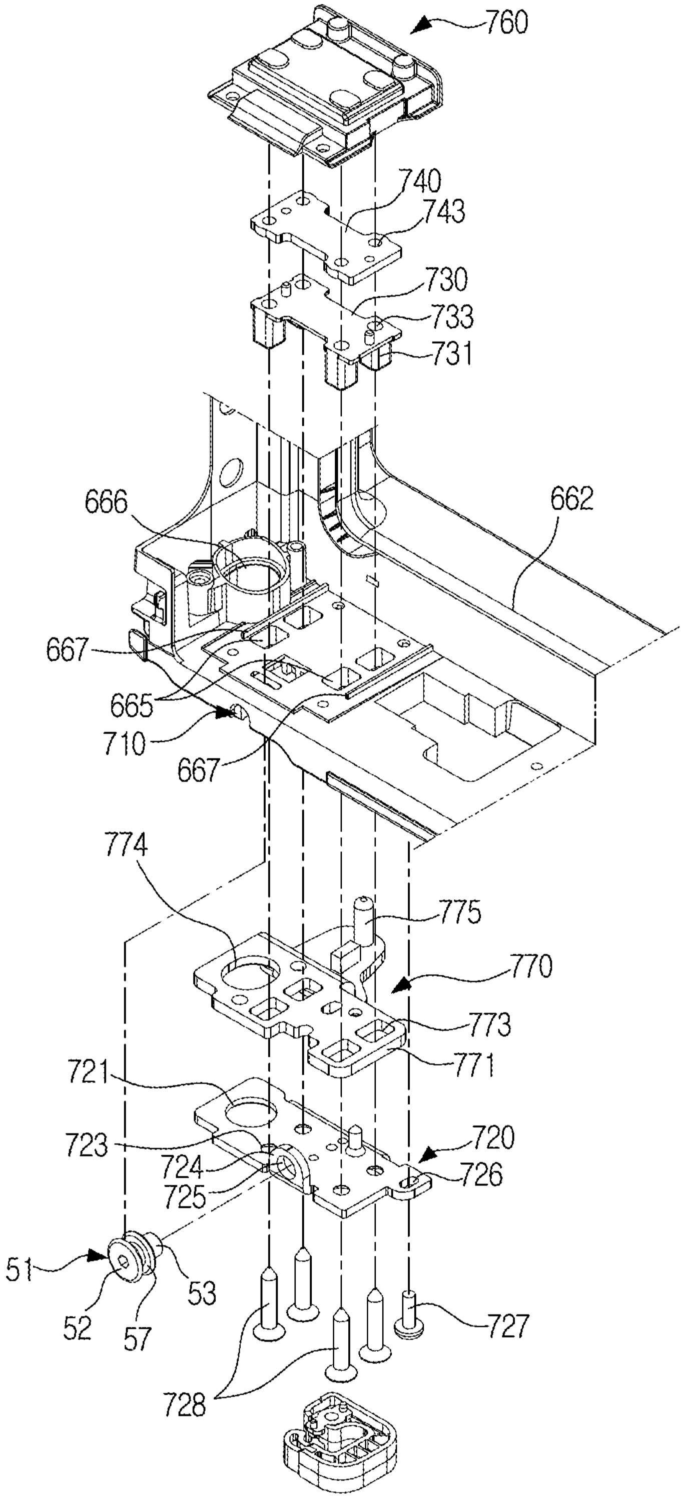
FIG. 29 is an exploded perspective view illustrating the hinge hole assembly of FIG. 28.
Figure 30:
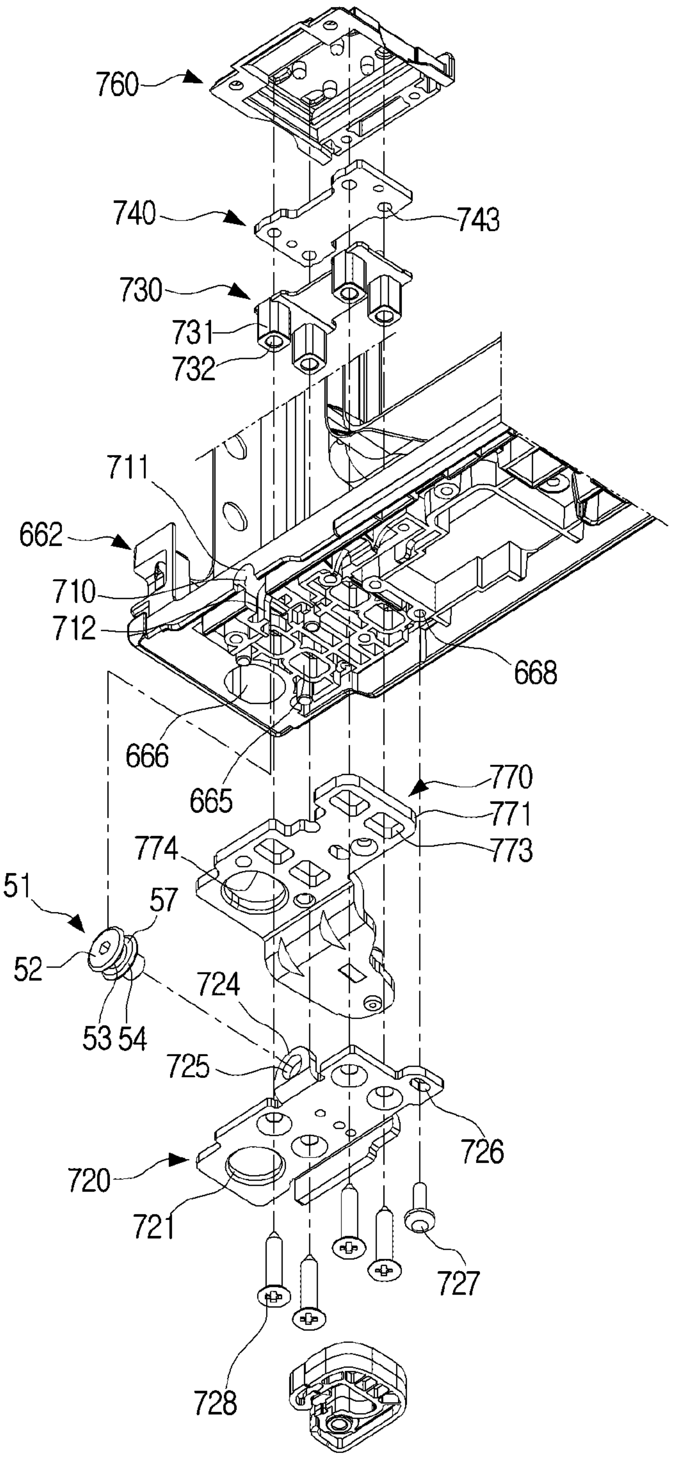
FIG. 30 is an exploded perspective view of the hinge hole assembly of FIG. 28 viewed from below.
Figure 31:
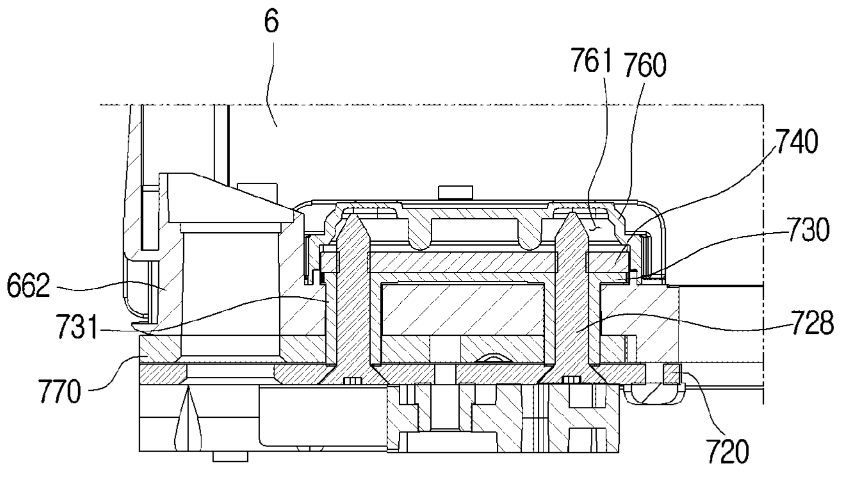
FIG. 31 is a cross-sectional view of the hinge hole assembly of FIG. 28 taken along line □-□.

FIG. 27 is a rear perspective view illustrating the hinge hole assembly disposed in the door frame of FIG. 26. FIG. 28 is a perspective view illustrating a state in which a hinge cover is removed from the hinge hole assembly of FIG. 27. FIG. 29 is an exploded perspective view illustrating the hinge hole assembly of FIG. 28. FIG. 30 is an exploded perspective view of the hinge hole assembly of FIG. 28 viewed from below. FIG. 31 is a cross-sectional view of the hinge hole assembly of FIG. 28 taken along line □-□.

Referring to FIGS. 27 to 31, the hinge hole assembly 700 according to an embodiment may include a lower moving plate 720, an upper moving plate 730, and a hinge hole adjuster 750.

The lower moving plate 720 is disposed on the lower surface of the lower frame part 662, and includes the hinge hole 721 into which the hinge shaft 702 (see FIGS. 32A and 32B) is inserted. The hinge hole 721 is formed in a size corresponding to the hinge shaft 702 fixed to the cabinet 3. Accordingly, the lower moving plate 720 does not move with respect to the hinge shaft 702.

The lower moving plate 720 is disposed to be movable with respect to the lower frame part 662. The lower moving plate 720 is formed to be movable with respect to the lower frame part 662 integrally with the upper moving plate 730.

The lower moving plate 720 includes a plurality of coupling holes 723 for coupling with the upper moving plate 730. In this embodiment, the lower moving plate 720 is provided with four coupling holes 723.

In addition, the lower moving plate 720 may include a locking hole 726 for fixing the lower moving plate 720 to the lower frame part 662. The locking hole 726 is formed as an elongated hole in the moving direction of the lower moving plate 720.

A locking screw hole 668 to which a locking bolt 727 for fixing the lower moving plate 720 is fastened is provided on the lower surface of the lower frame part 662. When the locking bolt 727 is inserted into the locking hole 726 of the lower moving plate 720 and fastened to the locking screw hole 668 of the lower frame part 662, the lower moving plate 720 is fixed to the lower frame part 662. In other words, in this embodiment, the locking bolt 727 is used as a locking member for fixing the lower moving plate 720 to the door frame 660, that is, the door.

In addition, the lower moving plate 720 includes a fixing part 724 to which the front and rear adjusting bolt 51 is fastened. The fixing part 724 extends substantially perpendicular to the lower moving plate 720, and is provided with an adjusting bolt hole 725 to which the front and rear adjusting bolt 51 is fastened. The lower moving plate 720 is disposed so that the fixing part 724 is received in a fixing groove 710 provided in the lower frame part 662.

The front and rear adjusting bolt 51 may include a head 52, a body 53, and an intermediate ring 54. The front and rear adjusting bolt 51 is the same as the front and rear adjusting bolt 51 used in the hinge 10 according to the above-described embodiment. Therefore, a detailed description thereof is omitted.

The lower frame part 662 is provided with the fixing groove 710. In detail, the fixing groove 710 having a hooking portion 712 is provided on the lower surface of the lower frame part 662. The fixing part 724 of the lower moving plate 720 is received in the fixing groove 710. The fixing part 724 of the lower moving plate 720 may move back and forth in the fixing groove 710. The front and rear adjusting bolt 51 is disposed between the hooking portion 712 of the fixing groove 710 and the fixing part 724 of the lower moving plate 720. The fixing groove 710 supports the front and rear adjusting bolt 51 to rotate in place without moving in the axial direction of the front and rear adjusting bolt 51. Accordingly, the front and rear adjusting bolt 51 disposed in the fixing groove 710 may rotate, but does not move back and forth with respect to the lower frame part 662.

The fixing groove 710 is formed to have a depth that can accommodate at least ⅔ or more of the head of the front and rear adjusting bolt 51, and communicates with the front surface of the lower frame part 662. For example, the depth of the fixing groove 710 may be formed so that the entire head of the front and rear adjusting bolt 51 is accommodated within the fixing groove 710. The lower surface 711 of the fixing groove 710 may be formed in a semicircular shape having a size that can accommodate the head of the front and rear adjusting bolt 51.

The hooking portion 712 to be inserted into the hooking groove 57 of the front and rear adjusting bolt 51 is provided on the inner surface of the fixing groove 710. The hooking portion 712 may be formed as a groove into which the body 53 of the front and rear adjusting bolt 51 is inserted and the head 52 thereof is not inserted.

In detail, the hooking portion 712 is formed to protrude from the inner surface of the fixing groove 710 so that the hooking portion 712 may be inserted into the hooking groove 57 of the front and rear adjusting bolt 51. The lower surface of the hooking portion 712 protrudes in a semicircular shape from the lower surface of the fixing groove 710. The radius of the lower surface of the hooking portion 712 is smaller than the radius of the lower surface of the fixing groove 710. Accordingly, the fixing groove 710 is formed to have a size that the head 52 and the intermediate ring 54 of the front and rear adjusting bolt 51 may be inserted into the fixing groove 710, but the hooking portion 712 is formed to have a size that only the body 53 of the front and rear adjusting bolt 51 may be inserted into the hooking portion 712.

The upper moving plate 730 is disposed on the upper surface of the lower frame part 662. The upper moving plate 730 is disposed to be movable with respect to the upper surface of the lower frame part 662. The upper moving plate 730 is formed to be movable with respect to the lower frame part 662 integrally with the lower moving plate 720. Accordingly, the lower frame part 662 is positioned between the upper moving plate 730 and the lower moving plate 720.

The upper moving plate 730 includes a plurality of sleeves 731 provided perpendicular to the upper moving plate 730 for coupling with the lower moving plate 720. The plurality of sleeves 731 are provided to correspond to the plurality of coupling holes 723 of the lower moving plate 720. In this embodiment, because the lower moving plate 720 is provided with four coupling holes 723, the upper moving plate 730 is provided with four sleeves 731. The sleeve 731 is provided with a through hole 732 so that the bolt 728 may pass through the sleeve 731. In this embodiment, the plurality of sleeves 731 are integrally formed with the upper moving plate 730, but in another example, the plurality of sleeves 731 may be formed separately from the upper moving plate 730.

The upper moving plate 730 is provided with a plurality of fastening holes 733 corresponding to the plurality of sleeves 731 and through which the plurality of bolts 728 pass. In this embodiment, because four sleeves 731 are provided in the upper moving plate 730, four fastening holes 733 are formed in the upper moving plate 730. The plurality of sleeves 731 may allow the upper moving plate 730 and the lower moving plate 720 to maintain a predetermined distance.

A reinforcing plate 740 may be disposed above the upper moving plate 730. The reinforcing plate 740 is provided with a plurality of screw holes 743 to which the plurality of bolts 728 are fastened. In this embodiment, because the upper moving plate 730 is provided with four fastening holes 733, the reinforcing plate 740 is provided with four screw holes 743 corresponding to thereto. The reinforcing plate 740 may be formed of a rigid metal plate.

Accordingly, when the plurality of bolts 728 are passed through the plurality of coupling holes 723 of the lower moving plate 720, the plurality of sleeves 731, and the plurality of fastening holes 733 of the upper moving plate 730, and are fastened to the plurality of screw holes 743 of the reinforcing plate 740, the lower moving plate 720 is integrally coupled to the upper moving plate 730.

In the above, the upper moving plate 730 and the lower moving plate 720 are coupled using the reinforcing plate 740 and the plurality of bolts 728, but the disclosure is not limited thereto. As another example, when the upper moving plate 730 has sufficient rigidity, a female screw may be formed on the inner surface of each of the plurality of fastening holes 733 of the upper moving plate 730. In this case, when the plurality of bolts 728 are fastened to the plurality of fastening holes 733 of the upper moving plate 730, the lower moving plate 720 may be integrally coupled to the upper moving plate 730.

The lower frame part 662 is provided with a plurality of guide holes 665 for guiding the forward and backward movements of the upper moving plate 730 and the lower moving plate 720. The plurality of guide holes 665 may be formed as elongated holes penetrating the lower frame part 662. The elongated holes forming the plurality of guide holes 665 are formed to be elongated in the direction perpendicular to the lower frame part 662, that is, the front surface of the door.

The plurality of sleeves 731 of the upper moving plate 730 are inserted into the plurality of guide holes 665 and are formed to slide along both inner surfaces of the guide holes 665, respectively. Accordingly, the upper moving plate 730 may move forward and backward by a predetermined distance with respect to the lower frame part 662 along the plurality of guide holes 623.

A pair of guide protrusions 667 may be provided on both sides of the plurality of guide holes 665 on the upper surface of the lower frame part 662. The pair of guide protrusions 667 are formed to guide the upper moving plate 730 moving back and forth with respect to the lower frame part 662.

In addition, the lower frame part 662 is provided with a door hinge hole 666 into which the hinge shaft 702 is inserted. The door hinge hole 666 is formed as an elongated hole, so that the hinge shaft 702 may move back and forth within the door hinge hole 666. When the hinge shaft 702 is fixed to the cabinet 3 as in this embodiment, the lower frame part 662 in which the door hinge hole 666 is formed may move back and forth with respect to the hinge shaft 702.

The hinge hole adjuster 750 may be formed to move the lower moving plate 720 in the front-rear direction with respect to the front surface of the door, that is, the front surface of the lower frame part 662. In this embodiment, the hinge hole adjuster 750 may include the hooking portion 712 formed perpendicular to the fixing groove 710 and the front and rear adjusting bolt 51 which rotates with respect to the hooking portion 712 and moves the lower moving plate 720 back and forth with respect to the lower frame part 662.

Therefore, in the state where the hooking portion 712 of the fixing groove 710 is hooked on the hooking groove 57 of the front and rear adjusting bolt 51, when the front and rear adjusting bolt 51 is turned, the lower moving plate 720 is moved back and forth with respect to the lower frame part 662, that is, the door by the front and rear adjusting bolt 51 fastened to the fixing part 724 of the lower moving plate 720.

A hinge cover 760 may be disposed above the upper moving plate 730. The hinge cover 760 is fixed to the upper surface of the lower frame part 662 to form a space 761 in which the upper moving plate 730 may move. Accordingly, when the urethane is filled in the inner space of the door, the urethane does not penetrate between the hinge cover 760 and the lower frame part 662.

As illustrated in FIGS. 29 and 30, a sub-hinge 770 supporting a sub-door (not illustrated) may be disposed between the lower frame part 662 and the lower moving plate 720. The sub-hinge 770 may include a sub-hinge plate 771 and a sub-hinge shaft 775.

The sub-hinge plate 771 may be formed to be fixed to the lower surface of the lower frame part 662. In other words, the sub-hinge plate 771 may form a portion of the lower surface of the lower frame part 662.

The sub-hinge plate 771 includes a plurality of sub guide holes 773 and a sub door hinge hole 774 corresponding to the plurality of guide holes 665 and the door hinge hole 666 of the lower frame part 662. The plurality of sub guide holes 773 and the sub door hinge hole 774 are formed as elongated holes, respectively.

Figure 32A:
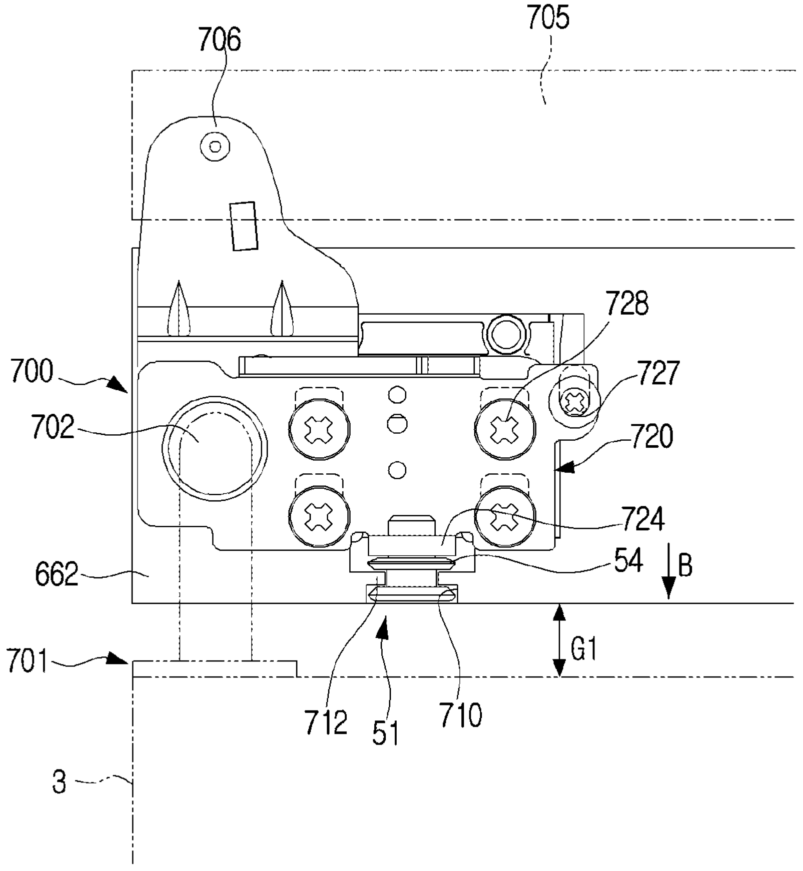
FIGS. 32A and 32B are a bottom view and a side view of a hinge hole assembly illustrating a state which a door is furthest from a cabinet.
Figure 32B:
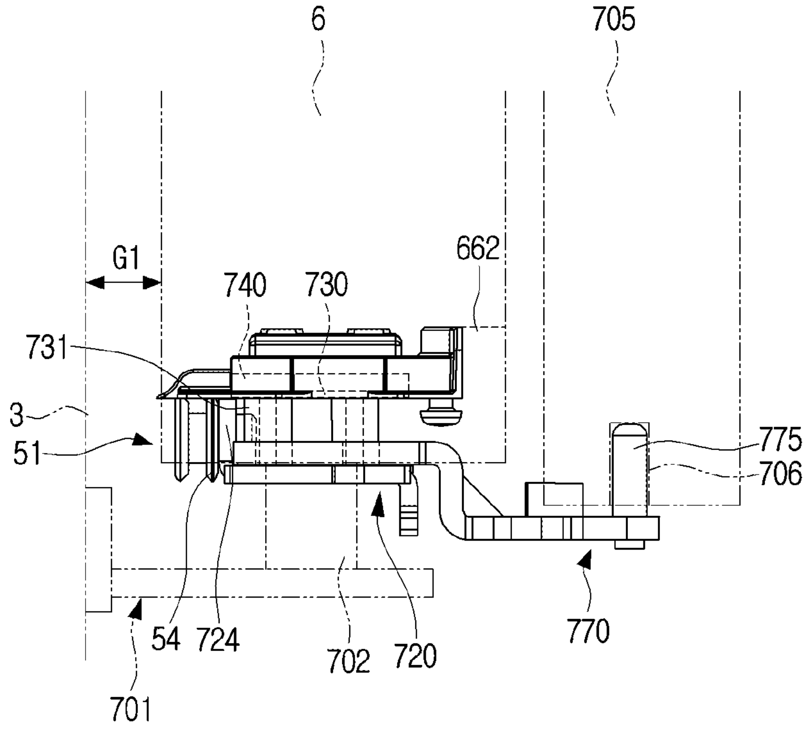
Figure 33A:
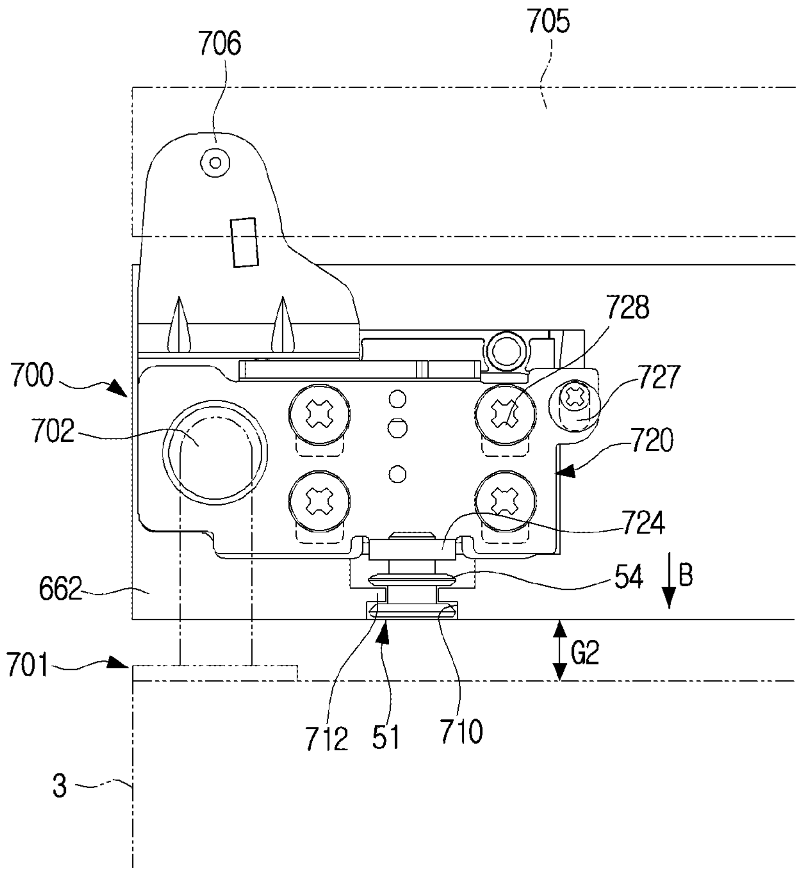
FIGS. 33A and 33B are a bottom view and a side view of a hinge hole assembly illustrating a state which a door is in close proximity to a cabinet.
Figure 33B:
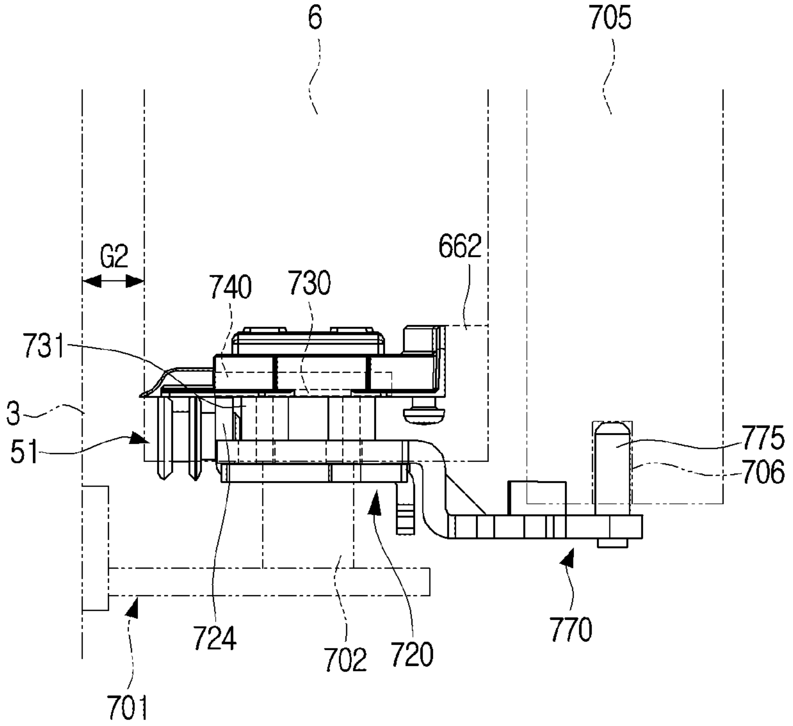

The sub-hinge shaft 775 is formed perpendicular to the sub-hinge plate 771 and is inserted into the sub hinge hole 706 provided on the lower surface of the sub-door 705 (see FIGS. 32B and 33B).

In the case of a refrigerator that does not include the sub-door 705, the above-described sub-hinge 770 is not disposed between the lower frame part 662 and the lower moving plate 720. In this case, the lower moving plate 720 is directly disposed on the lower surface of the lower frame part 662.

Hereinafter, a method of adjusting the level difference between the doors using the hinge hole assembly 700 according to an embodiment will be described in detail with reference to FIGS. 32A to 33B.

FIGS. 32A and 32B are a bottom view and a side view of a hinge hole assembly illustrating a state which a door is furthest from a cabinet. FIGS. 33A and 33B are a bottom view and a side view of a hinge hole assembly illustrating a state which a door is in close proximity to a cabinet.

Referring to FIGS. 32A and 32B, the intermediate ring 54 of the front and rear adjusting bolt 51 coupled to the hooking portion 712 of the fixing groove 710 is in contact with the fixing part 724 of the lower moving plate 720. In this case, the gap G1 between the front surface of the cabinet 3 and the rear surface of the door 6 is maximized.

In detail, because the distance between the hinge shaft 702 fixed to the cabinet 3 and the fixing part 724 of the lower moving plate 720 is constant and the fixing groove 710 is formed in the door 6, that is, the lower surface of the lower frame part 662, when the intermediate ring 54 of the front and rear adjusting bolt 51 coupled to the hooking portion 712 of the fixing groove 710 comes into contact with the fixing part 724 of the lower moving plate 720, the rear surface of the door 6 is positioned closest to the fixing part 724 of the lower moving plate 720. Accordingly, the gap G1 between the front surface of the cabinet 3 and the rear surface of the door 6 is maximized.

In this state, when the front and rear adjusting bolt 51 is turned, the distance between the door 6 and the cabinet 3 may be adjusted. For example, the user may insert the hexagonal wrench in the hexagonal groove 56 of the front and rear adjusting bolt 51 and rotate the front and rear adjusting bolt 51 in one direction.

When the front and rear adjusting bolt 51 is rotated in one direction, the fixing part 724 of the lower moving plate 720 is spaced apart from the intermediate ring 54 of the front and rear adjusting bolt 51. In detail, because the threaded portion 55 of the front and rear adjusting bolt 51 is fastened to the adjusting bolt hole 725 of the fixing part 724 of the lower moving plate 720 and the intermediate ring 54 of the front and rear adjusting bolt 51 is hooked on the hooking portion 712 of the fixing groove 710, when the front and rear adjusting bolt 51 rotates in one direction, the lower moving plate 720 is moved. However, because the lower moving plate 720 is fixed to the hinge shaft 702 of the hinge 701 disposed in the cabinet 3, the lower moving plate 720 is not moved, and conversely the lower frame part 662 in which the fixing groove 710 is formed is moved in the B direction. Accordingly, the door 6 including the lower frame part 662 moves in the B direction to approach the front surface of the cabinet 3.

A state in which the front and rear adjusting bolt 51 is rotated in one direction to bring the door 6 closer to the front surface of the cabinet 3 is illustrated in FIGS. 33A and 33B. At this time, the gap G2 between the rear surface of the door 6 and the front surface of the cabinet 3 in FIG. 33A is narrower than the gap G1 between the rear surface of the door 6 and the front surface of the cabinet 3 in FIG. 32A (G2<G1).

In order to widen the gap G2 between the rear surface of the door 6 and the front surface of the cabinet 3 in FIGS. 33A and 33B, the front and rear adjusting bolt 51 is rotated in the opposite direction. When the front and rear adjusting bolt 51 is rotated to the maximum in the opposite direction, the fixing part 724 of the lower moving plate 720 comes into contact with the intermediate ring 54 of the front and rear adjusting bolt 51 as illustrated in FIG. 32A.

In the case of the hinge 701 and the hinge hole assembly 700 having the structure described above, when the front and rear adjusting bolt 51 is rotated, the gap between the door 6 and the cabinet 3 may be adjusted. Accordingly, when a level difference occurs between the upper left door 5 and the upper right door 6, the level difference may be eliminated by moving the upper right door 6 back and forth with respect to the front surface of the cabinet 3 using the front and rear adjusting bolt 51 of the hinge hole assembly 700.

As described above, in the refrigerator with a hinge according to an embodiment, the hinge shaft may be moved back and forth with respect to the front surface of the cabinet, so that the level difference between the left door and the right door may be adjusted.

In addition, as described above, in the refrigerator provided with the hinge hole assembly according to an embodiment, the door in which the hinge hole assembly is disposed may be moved back and forth with respect to the front surface of the cabinet, so that the level difference between the left door and the right door may be adjusted.

The disclosure has been described above in an exemplary manner. The terms used herein are for the purpose of description and should not be construed in a limiting sense. Various modifications and variations of the disclosure are possible according to the above contents. Accordingly, unless otherwise stated, the disclosure may be practiced freely within the scope of the claims.

What is claimed is:

1. A refrigerator comprising:

a cabinet;

a door configured to open or close the cabinet;

a fixing bracket fixed to the cabinet, the fixing bracket including an adjusting bolt hole;

a moving bracket under the fixing bracket to be movable with respect to the fixing bracket, the moving bracket including an adjusting hole corresponding to the adjusting bolt hole;

a hinge bracket fixed to the moving bracket, the hinge bracket including:

a central hole corresponding to the adjusting hole of the moving bracket; and a hinge shaft rotatably coupled to a lower end of the door; and a hinge shaft adjuster configured to move the moving bracket in a forward direction or a rearward direction with respect to a front surface of the cabinet, the hinge shaft adjuster including a front and rear adjusting bolt fastened to the adjusting bolt hole of the fixing bracket and configured to move the moving bracket in a forward direction or a rearward direction with respect to the fixing bracket, wherein the front and rear adjusting bolt is accessible through the central hole of the hinge bracket and the adjusting hole of the moving bracket so that in response to turning the front and rear adjusting bolt, the moving bracket is moved in the forward direction or the rearward direction with respect to the fixing bracket, and based on the moving bracket moving in the forward direction or the rearward direction, the front and rear adjusting bolt moves in the forward direction or the rearward direction together with the moving bracket.

2. The refrigerator of claim 1, wherein the hinge shaft adjuster further comprises:

a fixing part extending vertically from the fixing bracket; and the front and rear adjusting bolt is fastened to the fixing part and is configured to move the moving bracket in the forward direction or the rearward direction with respect to the front surface of the cabinet.

3. The refrigerator of claim 2, wherein the front and rear adjusting bolt includes a hooking groove, the moving bracket includes a hooking portion hooked on the hooking groove of the front and rear adjusting bolt, and while the hooking portion of the moving bracket is hooked on the hooking groove of the front and rear adjusting bolt and in response to turning the front and rear adjusting bolt, the moving bracket is moved in the forward direction or the rearward direction with respect to the fixing bracket.

4. The refrigerator of claim 2, wherein the fixing bracket includes a plurality of female screws on the fixing part, the moving bracket includes a plurality of elongated holes corresponding to the plurality of female screws, the plurality of elongated holes formed to be elongated in a direction perpendicular to the front surface of the cabinet, and the fixing bracket and the moving bracket are coupled by fastening a plurality of bolts to the corresponding plurality of female screws through the corresponding plurality of elongated holes.

5. The refrigerator of claim 4, wherein the plurality of female screws includes two female screws formed on a left side of the fixing part and a right side of the fixing part, respectively, the plurality of elongated holes includes two elongated holes corresponding to the two female screws, the plurality of bolts includes two bolts, and the fixing bracket and the moving bracket are coupled by fastening the two bolts to the corresponding two female screws through the corresponding two elongated holes.

6. The refrigerator of claim 1, wherein the hinge bracket includes:

a hinge support portion fixed to the moving bracket; and a hinge portion extending vertically from the hinge support portion and on which the hinge shaft is formed.

7. The refrigerator of claim 1, wherein the cabinet includes:

a bracket installation part on which the fixing bracket is installed; and an adjuster accommodating part having a step in front of the bracket installation part, and in which the hinge shaft adjuster is accommodated.

8. The refrigerator of claim 1, wherein in response to rotating the hinge shaft adjuster in a first direction, the moving bracket moves to the front direction with respect to the front surface of the cabinet, and in response to rotating the hinge shaft adjuster in a second direction, the moving bracket moves to the rear direction with respect to the front surface of the cabinet.

* * * * *